United States Patent [19]

Kupnicki et al.

[11] Patent Number: 4,742,544

[45] Date of Patent: May 3, 1988

[54] TELEVISION TRANSMISSION NETWORK WITH SCRAMBLING AND DESCRAMBLING

[76] Inventors: Richard A. Kupnicki, 584 Farewell Street, Oshawa, Ontario, Canada, L1H 6M8; Stanley R. Moote, 9 Gervais Drive, Brampton, Ontario, Canada, L6Y 2V3

[21] Appl. No.: 629,180

[22] Filed: Jul. 9, 1984

[51] Int. Cl.$^4$ .................... H04N 7/167; H04L 9/00
[52] U.S. Cl. ........................ 380/14; 380/19; 380/20; 380/37; 380/50
[58] Field of Search .............. 358/114, 119, 121, 122; 178/22.04, 22.07, 22.05, 22.19; 380/10, 14, 19, 20, 23, 36, 37, 50

[56] References Cited

U.S. PATENT DOCUMENTS

| | | | |
|---|---|---|---|
| 3,659,046 | 4/1972 | Angeleri et al. | 178/22.13 |
| 4,070,693 | 1/1978 | Shutterly | 358/122 X |
| 4,240,106 | 12/1980 | Michael et al. | 358/36 |
| 4,266,243 | 5/1981 | Shutterly | 358/116 X |
| 4,318,125 | 3/1982 | Shutterly | 358/121 |
| 4,388,643 | 6/1983 | Aminetzah | 358/122 X |
| 4,390,898 | 6/1983 | Bond et al. | 358/123 X |
| 4,392,123 | 7/1983 | Brüggemann | 358/36 X |
| 4,405,942 | 9/1983 | Block et al. | 358/119 |
| 4,484,027 | 11/1984 | Lee et al. | 358/122 X |
| 4,535,355 | 8/1985 | Arn et al. | 358/122 X |
| 4,605,961 | 8/1986 | Frederiksen | 358/121 X |

Primary Examiner—Stephen C. Buczinski
Assistant Examiner—Linda J. Wallace
Attorney, Agent, or Firm—Ridout & Maybee

[57] ABSTRACT

A controlled access television communications network in which scrambling and descrambling are accomplished by digital signal processing. At the scrambler, the video and audio information are digitized, segmented for example on a line-by-line basis, and randomly reordered. Decryption data corresponding to the random reordering of the information segments are derived, and inserted into the scrambled video data. A composite signal comprising the video data, audio modulated subcarrier, synchronizing signals and the decryption data is transmitted to the receivers along with dedicated keys whereby descramblers at the receivers are selectively enabled in accordance with the remote selection of authorized users.

11 Claims, 27 Drawing Sheets

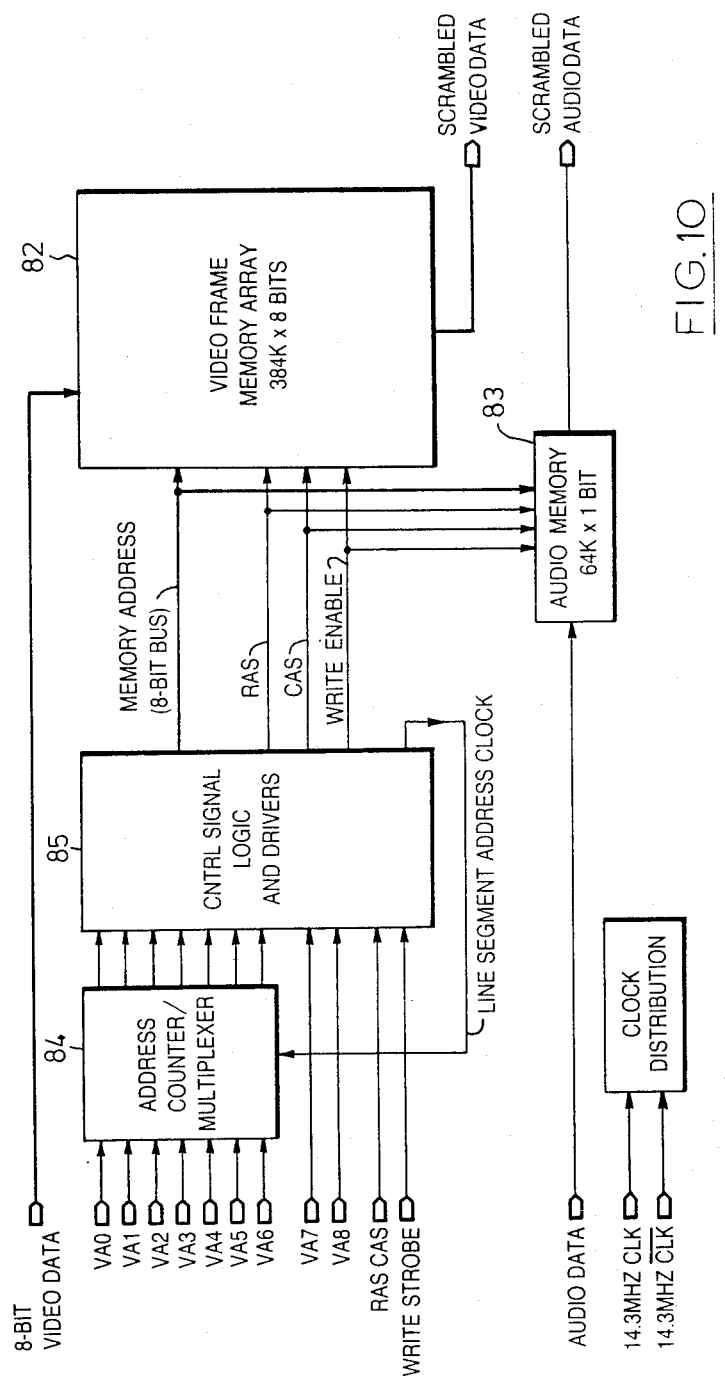

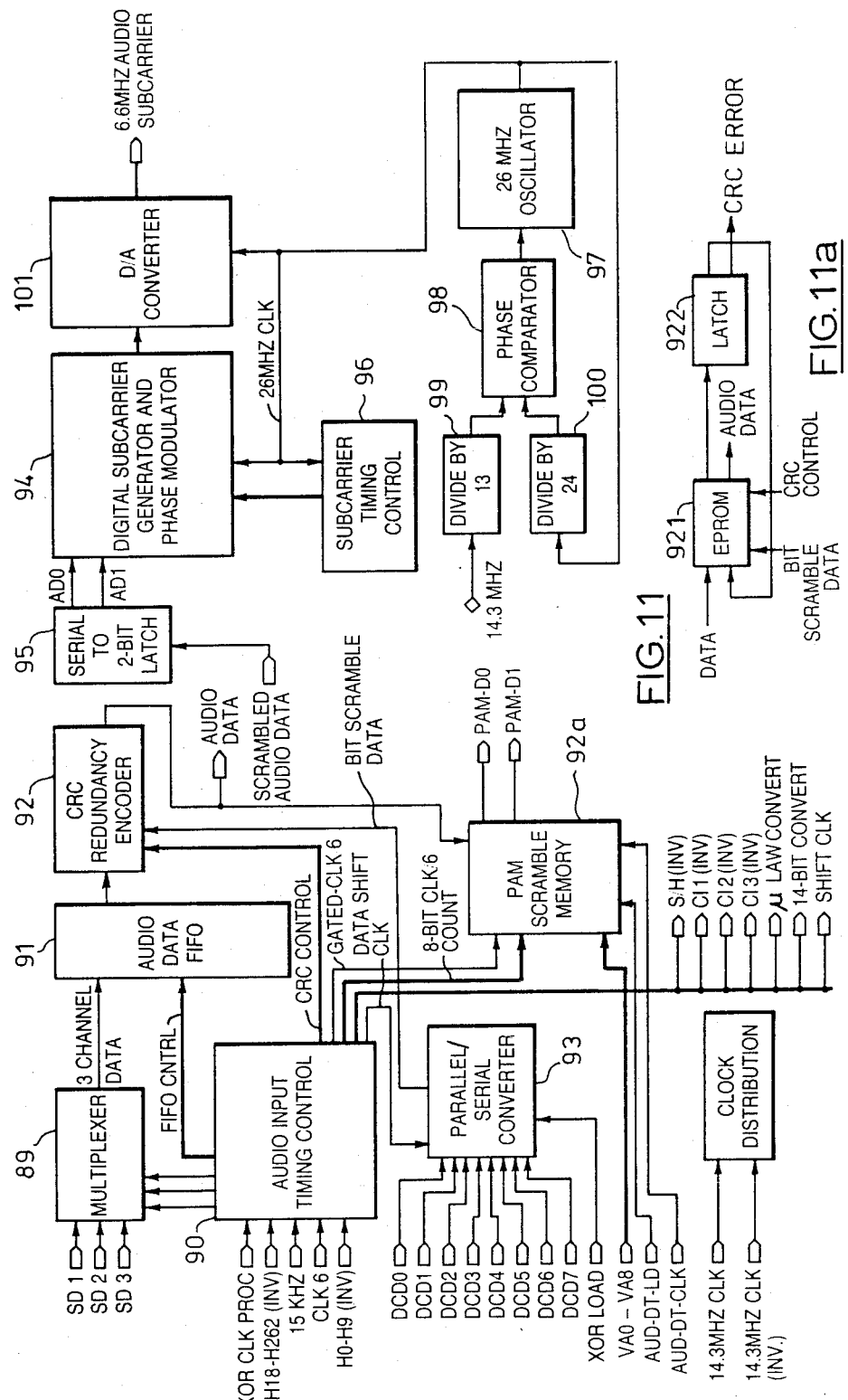

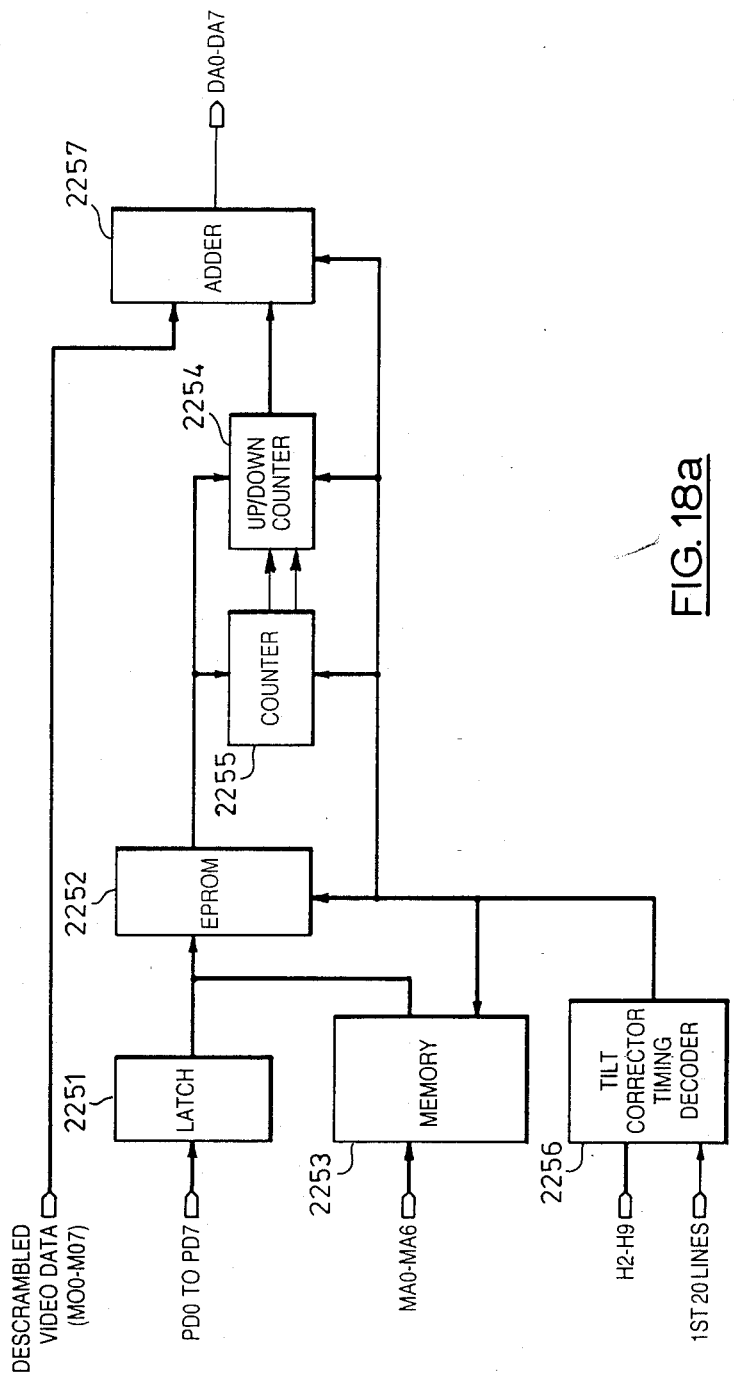

TELEVISION TRANSMISSION NETWORK WITH SCRAMBLING AND DESCRAMBLING

FIELD OF THE INVENTION

This invention relates to controlled access television transmission networks wherein both transmission quality and security against unauthorized eavesdropping are major concerns. The invention is applicable to video/audio tele-conferencing and to subscription television networks.

BACKGROUND OF THE INVENTION

The availability of satellite and microwave communications links, together with recent advances in electronics technology and signal processing hardware, have opened the door to the establishment of controlled access transmission networks. While the reduced cost of earth station receiving equipment brings the investment for such networks to a reasonable level, it also makes off-air piracy viable. Laws governing off-air reception by anyone willing to invest in the necessary equipment are either nonexistent or difficult to enforce. There is therefore a need for a method of scrambling television signals whereby to establish high security in such networks. Coupled with this need is the need to transmit the scrambled signals through existing distribution channels. Thus, parameters such as synchronizing information, finite bandwidth restriction and characteristic distortion of a link must be taken into account.

In any scrambling system, since the transmitted audio and video and data information has been scrambled to prevent its unauthorized use, it is necessary to provide descrambling control information to allow reconstruction of the transmitted signals by the authorized users. The security of this control information is therefore crucial to the security of the whole system.

Various analog scrambling methods are known and in current use. The methods employ, for example, sync suppression, video inversion or interfering carrier, and achieve scrambling by changing the transmission format of the video information in such a way that a standard receiver will not be able to reconstruct the image. The security provided by these known methods is quite limited, however. Since they rely extensively on hardware for decoding, they can be considered to be fixed algorithms in the sense that a one-time addition to, or modification of, an existing equipment will result in violation of the security. When the security is thus violated it can only be regained by replacement of the scrambling and descrambling equipment throughout the system.

SUMMARY OF THE INVENTION

According to the present invention, scrambling and descrambling are accomplished by digital signal processing, which not only permits the encoding, decoding, encrypting and imbedding of security "keys", but it also provides a medium for computer control. System security can, therefore, be hardware and software based. Individual descramblers in a given system can be selectively enabled from a central control point without physical access to the descrambling hardware. The scrambler is used to disallow general public usage of the television signals along with the associated audio and data channels. It does not disallow the reception of signals, but instead makes the resultant display on the television receiver totally unintelligible and audio and data undecodable. The process can be used for a variety of applications in addition to tele-conferencing, such as program distribution.

Use of digital signal processing of the video, audio and data signals adds another dimension to the security level. While analog scrambling methods allow the manipulation of voltage levels (as in the case of sync suppression and video inversion), or alteration of the frequency spectrum (as in the case of interfering carrier), the digital method retains these options and adds the ability to manipulate time. Since a signal can be digitized and placed in a memory for temporary storage, the rate and the order of the removal of the data from the memory has the effect of re-ordering what previously were sequential events. Some examples of this method are:

Line reversal, where lines are reversed end to end at random

Line position modulation, where the blanking interval is randomly narrowed or expanded, resulting in random positioning of line start with respect to synchronizing information.

Line segment swapping, where a video line or lines are segmented and the order of the segments is randomly intermixed.

Line dispersal, where a block of a given number of lines is selected and all of the lines within that block are randomly intermixed.

In the above examples, the word random is selected to illustrate the fact that with digital processing the ability exists to randomly re-order what was initially a series of sequential events.

If the sequence used in re-ordering the events is known to the descrambler, the original information can be reconstructed. Accordingly, the following conclusions regarding the security of such a system can be drawn:

1. The security of the video or audio information is a function of the number of segments which are re-ordered within a block, and the number of possible combinations in scrambling the block is a factorial function. For example, if one uses the line dispersal method where 120 lines of a block are randomly intermixed, there exist 120! or $10^{201}$ possible ways of arranging the lines. Only one out of $10^{201}$ sequences will allow reconstruction of the image even for that one block.

2. Since the descrambler requires the line ordering information (which we will call "control data"), the security of that information also governs the security of the overall system.

3. The selection of a different random number each time re-ordering is done further enhances the security of the system by the fact that even if one ordering sequence is found, it will be of no use for the next block of information.

Consideration will now be given to the channel which will carry the scrambled signal and the distortion constraints placed upon the method.

Synchronization

If the scrambled signal has to be transmitted over the currently existing video communication channels, it is important that horizontal, vertical and color burst portions of the signal be modified as little as possible in order for the line equipment and for monitoring equipment to function. The majority of the line processing equipment requires the horizontal sync and blanking period for D.C. stabilization of the waveforms (clamping). Thus, methods using sync suppression or substantial narrowing of horizontal sync, will degrade the signal quality by introducing line tilt or image smearing.

Non-linearity

Any form of transmission will exhibit some level of non-linearity in both amplitude and phase. Thus, methods which rely on manipulation of these parameters to achieve scrambling, are susceptible to these errors. One example of this method is video inversion, where the polarity of the video signal is randomly inverted to mask the content of the picture presentation.

Let it be assumed that the transmission link has an amplitude non-linearity error to cause compression of the black portion of the non-inverted video. Now, if an inverted video is transmitted via this link, the portion of video which was originally white becomes compressed since it is transmitted inverted. If one randomly alternates between inverted and non-inverted video and descrambles to restore the original image, the effect of the error is doubled because of the additional compression of the white level. This effect gets even more pronounced if the distortion is at both ends of the grey scale, as an example stretching of black and compression of white, resulting in flicker at the rate that the video inversion occurs.

Finite Bandwidth

In the above description it has been shown that digital processing offers the ability to manipulate events with respect to time. If care is not taken in selecting an appropriate scrambling algorithm, the possibility exists that the frequency spectrum of the original video signal will be expanded To illustrate this, consider a linear ramp video signal where the ramp starts at blanking level (or 0 IRE units), increases to 100 IRE units and then falls back to blanking at the end of the line. It is also assumed that the signal fits within a predetermined spectrum (e.g. 4.2 MHz). Select a scrambling method which consists of cutting a video line into two halves and changing the order of the halves. One now has, rather than a ramp, a sawtooth with the first segment starting at 50 IRE units. The important parameter to note here is that the first and the last transitions of the segment-interchanged signal were previously butted against each other, but are now at the opposite ends of the line and the transitions to and from blanking level are almost infinite. Due to the fact that these transitions have zero rise time, the required spectrum to transmit this signal has theoretically also increased to infinity.

If such a signal is transmitted via a limited spectrum link, the edges will become sloped and will ring. The reconstruction process required to achieve descrambling will no longer be perfect and therefore visible. Methods exist to reduce this effect, but the error will always be some function of the spectrum bandwidth.

From the above example one can see that, although digital signal processing offers the ability to manipulate time to achieve scrambling, it also places constraints on the occupied bandwidth of the scrambled signal.

In view of the foregoing, the following goals have been established:

1. High security in both video and audio.
2. Incur least amount of signal degradation.
3. No visible artifacts due to the scrambling process.
4. Scrambled video signal must meet standard video bandwidths.
5. Synchronization information should be altered as little as possible to allow the use of the clamping amplifiers throughout the transmission path.
6. Addressability of descramblers on an individual basis from the point of origin.
7. Time varying scrambling algorithm in audio, video and user data.
8. Horizontal lines 10 to 21 not scrambled.
9. The system security to be partitioned into the following:
   Video Scrambling
   Audio Scrambling
   Control Data Encryption Video Scrambling In view of the constraints mentioned above, an algorithm has been developed which makes use of the segmented nature of television picture information, i.e. the presence of horizontal sync pulses between scanning lines. If the normal order of lines in a sufficiently large block of lines is randomly dispersed, the task of re-assembling the lines in the proper order is enormous.

By dispersing lines during the H blanking period, no additional spikes or bandwidth is needed. The scrambled signal has RS170A sync, thus allowing the use of clamps and monitoring equipment. Since the NTSC format and bandwidth is maintained, a non-linear transmission link will create the same picture distortions whether the signal is scrambled or not.

Given a block of 120 successive scanning lines, i.e. half a field, the number of possible dispersal combinations is 120! or approximately 10 to the power of 201. This dispersal changes every 120th of a second.

To add to the complexity, it must be realized that it takes four such blocks to reconstruct one black and white image, and double that again for one color image.

The task of reconstructing a scrambled image is feasible only if the order in which the lines are transmitted is known. The data describing the line arrangement is transmitted continuously along with the scrambled video in an encrypted format, and the security of that data is part of the security of the entire system.

Audio Scrambling

The system provides three audio channels which are digitally sampled with a 44.1 KHz clock. Two of the channels are converted with a 14-bit linear resolution and the third is companded from 12 to 8 bits with a $\mu$-law scale, or optionally a 12-bit linear channel.

At this point, digitized audio is interleaved with the video data stream and processed in the same fashion, thus yielding identical statistical results.

Control Data Encryption

In order to conceal the control information necessary for reconstructing the video, audio, and user data, as well as the basis for selective addressability, data encryption is necessary. One of the many types of data encryption is the Data Encryption Standard (DES).

The DES uses a mathematical transformation to change data into apparently random noise with the use of a KEY. This noise is unintelligible to humans or machines. By using the same KEY and the inverse transformation, the encrypted data can be restored. Only the correct KEY can restore the data to its original form. The security of the system is thus a direct function of the possession of the KEY.

In order to prevent easy access to the KEY at the descrambling end, and to further enhance the security of this system, the encryption KEY is super-encrypted with a unique number. This number is assigned to each descrambler in the field and stored in a tamper-proof medium. These super-encrypted KEYS are stored in each descrambler. Any one of these KEYS can be used at any time as called for by the Scrambler. The KEYS are reconstructed by the information transmitted in the control data block. Any KEY can be activated at any given time, thus making it possible to configure different user levels with instantaneous response. There are more than 10 to the power of 16 different keys available. This makes key searching for the purpose of piracy futile.

Triple redundancy and continuous status updating of the transmitted descrambling and level assignment information is used to minimize program disruption due to transmission noise or power failure.

BRIEF DESCRIPTION OF THE DRAWINGS

In order that the invention may be more readily understood, one embodiment thereof will now be described, by way of example, with reference to the accompanying drawings. In the drawings:

FIG. 10 is a block diagram of the Digital Memory of FIG. 6;

FIG. 11 is a block diagram of the Audio Modulator of FIG. 6;

FIG. 11a shows a detail of the implementation of the CRC Redundancy Encoder of FIG. 11;

FIG. 18a is a block diagram of the Tilt Corrector of FIG. 18;

DESCRIPTION OF THE PREFERRED EMBODIMENT

General Concepts

Figure 1:
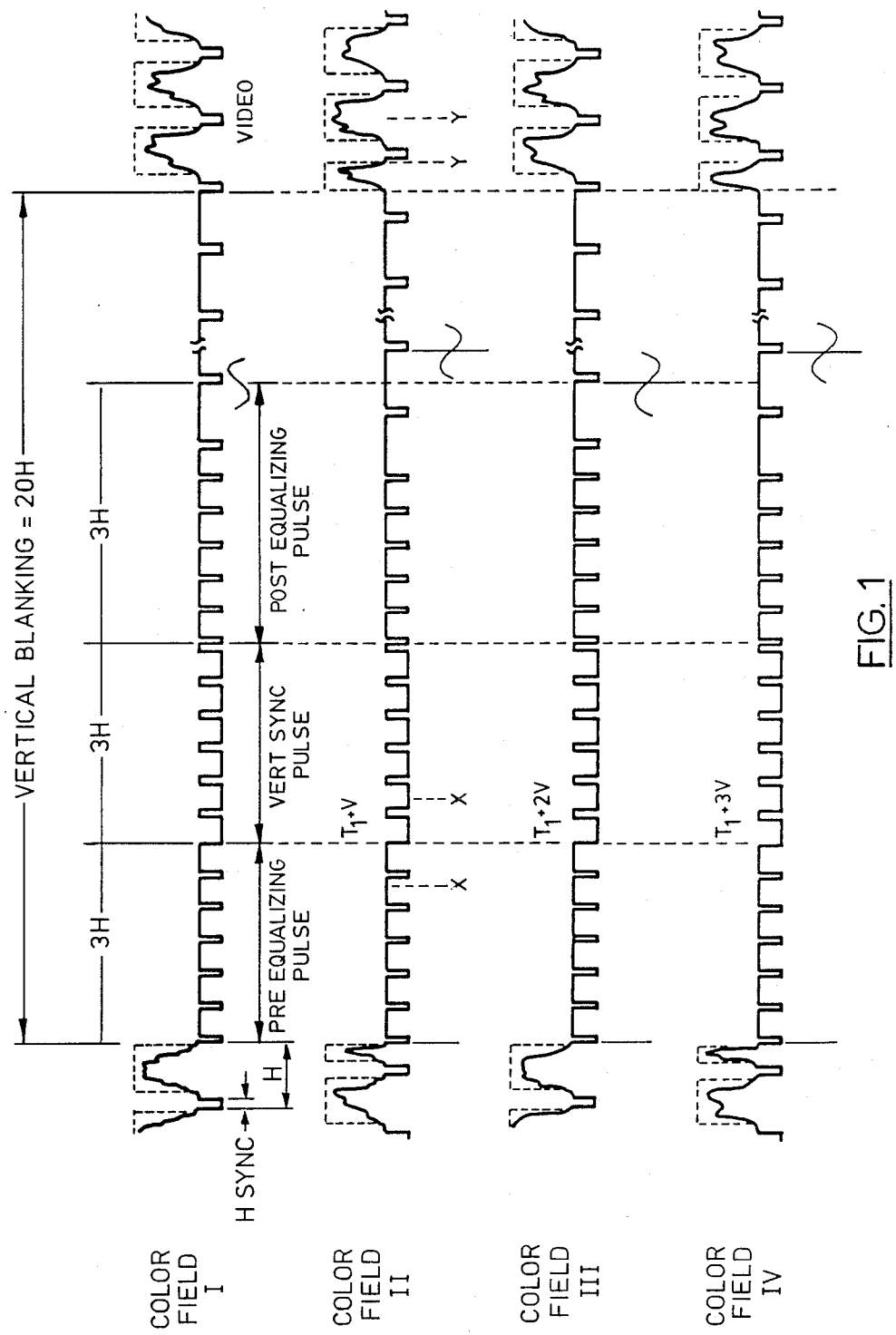
FIG. 1 is a timing diagram representative of a typical video signal with synchronization signals and four color fields.

The waveforms shown in FIG. 1 are representative of a color television studio picture line amplifier output which meets the specification RS170A. The scrambler/descrambler system described herein by way of example is designed to be compatible with the said specification. Accordingly, as represented in FIG. 1, the specification provides, inter alia, that:

(a) The burst frequency shall be 3.579545 MHz ±10 Hz.

(b) The horizontal scanning frequency shall be 2/455 times the burst frequency, i.e. one scan period (H) is 63.556 μS.

(c) The vertical scanning frequency shall 2/525 times the horizontal scanning frequency, i.e. one scan period (V) is 16,638 μS.

(d) The start of color fields I and III is defined by a whole line between the first equalizing pulse and the preceding H sync pulse. The start of color fields II and IV is defined by a half line between the first equalizing pulse and the preceding H sync pulse. Color field I is that field with positive zero crossings of reference subcarrier nominally coincident with the 50% amplitude point of the leading edges of even numbered horizontal sync pulses.

(e) The zero crossings of reference subcarrier shall be nominally coincident with the 50% point of the leading edges of all horizontal sync pulses. The reference subcarrier is a continuous signal with the same instantaneous phase as "burst".

(f) The interval from line 17 to line 20 of each field may be used for test, cue and control signals.

(g) The start of "burst" is defined by the zero crossing, whether it be of positive or negative slope, that precedes the first half cycle of subcarrier that is 50% or more of the burst amplitude. Its position is nominally 19 cycles of subcarrier from the 50% amplitude point of the leading edge of sync (see FIG. 2c).

(h) The end of burst is defined by the zero crossing, (of positive or negative slope), that follows the last half cycle of subcarrier that is 50% or more of the "burst" amplitude.

Figure 2A:
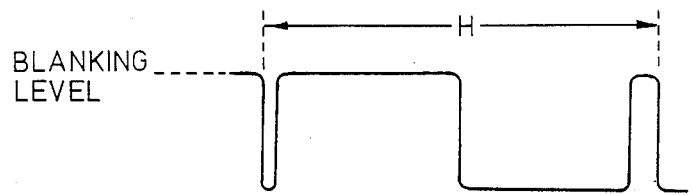
FIG. 2a shows a detail of the waveform at X—X in FIG. 1.
Figure 2B:
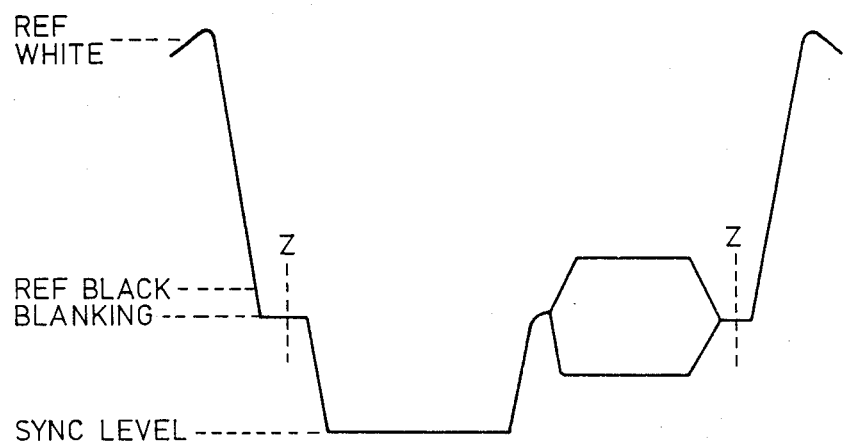
FIG. 2b shows a detail of the waveform at Y—Y in FIG. 1.
Figure 2C:
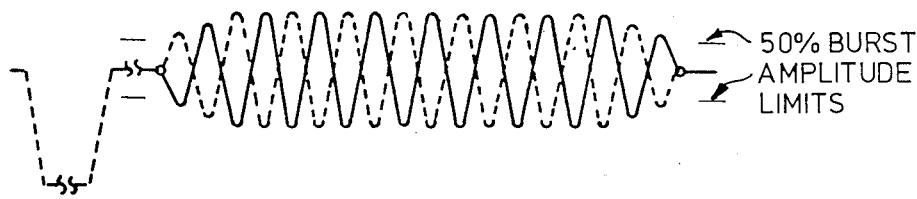
FIG. 2c shows a detail of the waveform at Z—Z in FIG. 2b.

(i) Monochrome signals shall be in accordance with FIGS. 1 and 2 except that "burst" is omitted, and fields III and IV are identical respectively to fields I and II.

The present equipment uses a software implementation of the Data Encryption Standard (DES), which Standard is described in Federal Information Processing Standards Publication No. 46 dated Jan. 15, 1977, issued by the National Bureau of Standards.

Figure 3:
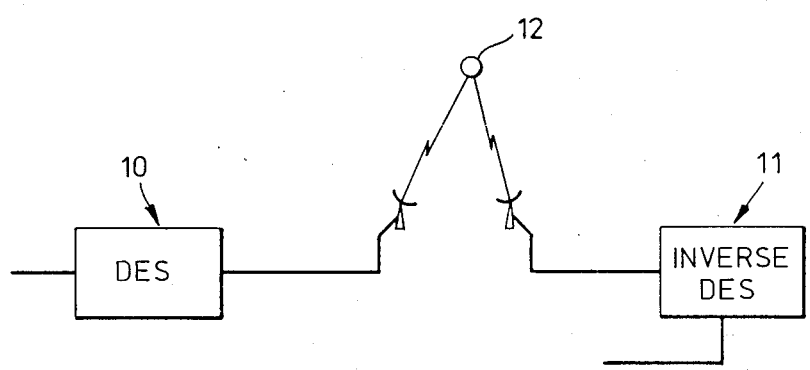
FIG. 3 is a simplified diagram of the system with a satellite communications link.

Referring to FIG. 3, at the transmitting station 10 information to be transmitted is first scrambled and then transmitted to the receiving station 11 via a satellite link 12. A descrambler which is authorized to receive the information is issued with a key by which the received control data can be descrambled. The following description deals particularly with the scrambler and the descrambler which are unique to the system, other equipment at the transmitter and receiver being conventional and not described herein.

Scrambler/Descrambler Overview

The scrambler inputs consist of a video signal, audio signals, user data and descrambler control information. The descramblers of the various receiving stations can be enabled one at a time, by means of this control information. The control information may be initiated from a point which is remote from the scrambling hardware, for example via a standard telephone line. It is also possible to disable the scrambler from the remote point, and once disabled the scrambler will pass the input video and audio signals unaltered. The scrambler output consists of a single analog baseband composite signal containing scrambled video and audio signals and decryption control signals.

The descrambler input consists of the scrambled baseband composite signal received by the user's receiving equipment. Having digitized this signal and detected valid control data, the unit descrambles and separates both video and audio. All encoded decryption and control data is removed from the output video signals. If the received signal is not scrambled, it is passed through the scrambler unaltered to the standard receiving equipment. Independent audio channels are then necessary.

Figure 4:
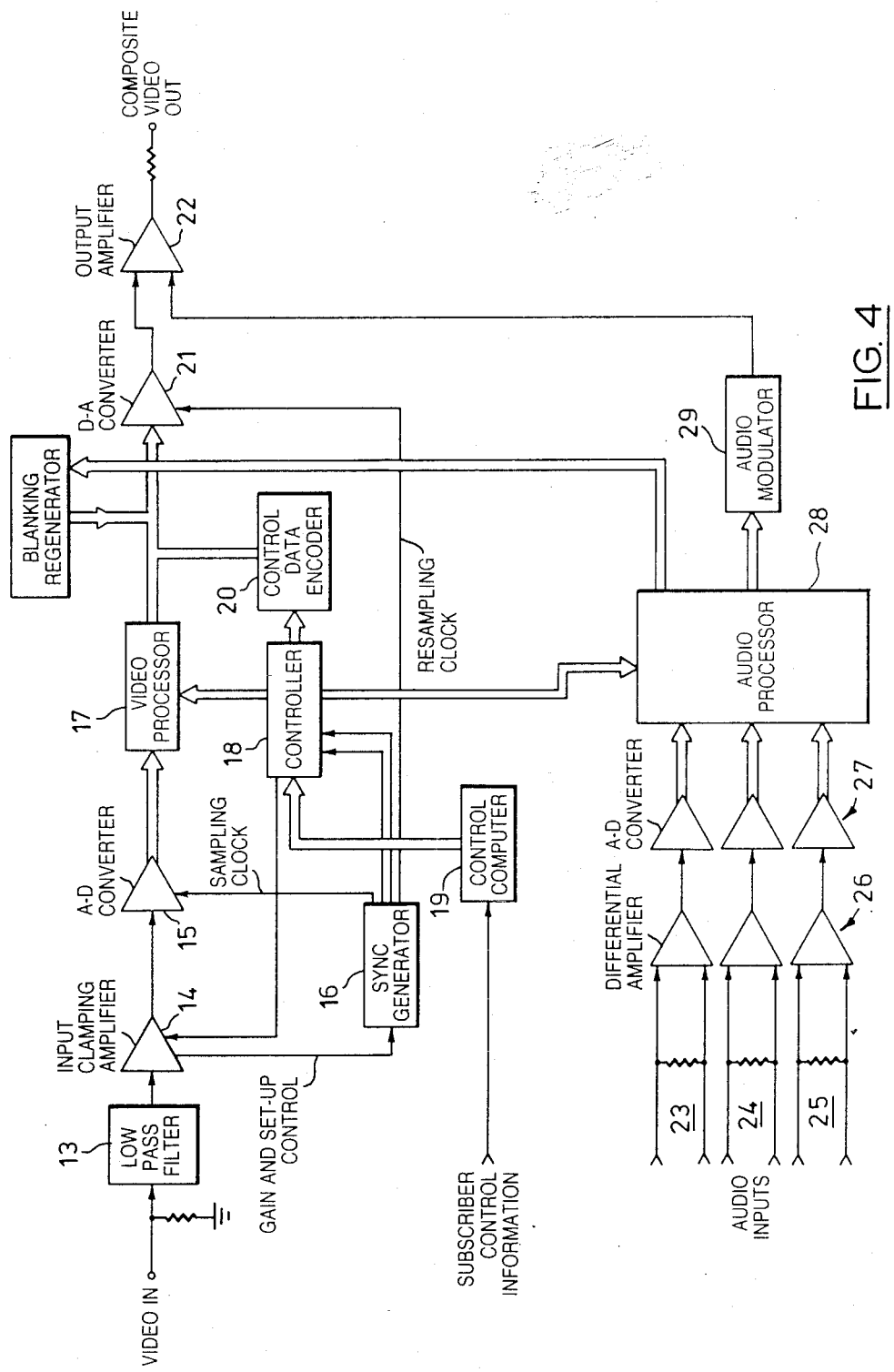
FIG. 4 is a simplified block diagram of the scrambler of the system.

Referring to FIG. 4, a low pass filter 13 filters the input video, which is passed to a clamping amplifier 14 and D.C. restored. The signal is then digitally sampled by an analog/digital converter 15 at 14.3 MHz, or more exactly, at four times the color subcarrier frequency. Sync is stripped from the D.C. restored video and is used by a sync generator 16 to generate various control signals.

The digitized signal from the A/D converter 15 is received by a video processor 17 which contains 384K-bytes of high speed memory to allow manipulation of the video data by the controller 18. This controller 18 receives addressing information from a control computer 19 and passes the combined data to the control data encoder 20. The controller 18 prevents the scrambling of lines 10 to 21 of the video signal in order to allow unaltered passage of VITS, VIRS or station ID.

The control data encoder 20, in turn, encrypts this data and feeds it into the digitized video data stream. The encrypted control data contains addressing information at a rate of approximately 14,400 descramblers per second.

Regenerated sync and burst are also added to the video data stream, and the resultant is fed to a digital-/analog converter 21, followed by a folded noise filter (not shown) and a 75 ohm video amplifier 22.

Three balanced 600 ohm audio inputs 23, 24, 25, after amplification by input amplifiers 26, are digitally sampled at 44.1 KHz in three separate A/D converters 27. Two of the audio channels are 14-bit linear, while the third is $\mu$-law companded from 12 to 8-bits, or optionally 12-bit linear. The signals of the three channels are processed by audio processor 28, the latter being timed by the controller 18. The audio processor 28 delays the audio signals in order to match the video processor delay, thus maintaining lip synchronization as well as scrambling the audio data.

The processed audio data is fed to a modulator 29 and modulates a QPSK subcarrier of 6.6 MHz. This subcarrier is summed with the video in the output amplifier 22, resulting in the scrambled composite output. In the event that a 12-bit linear channel is used, the processed audio data is added to the horizontal blanking interval in a pulse amplitude modulation (PAM) format.

Figure 5:
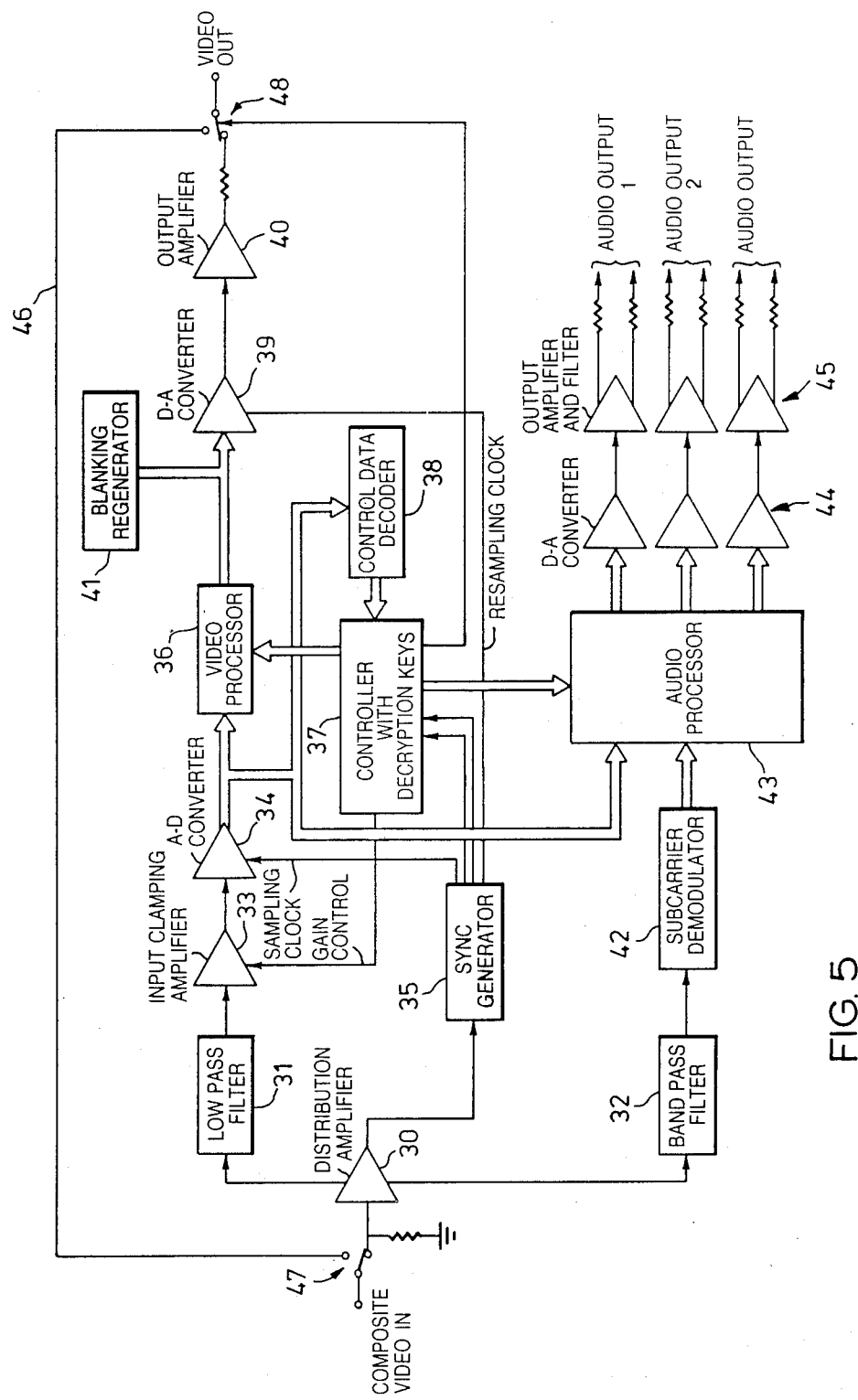
FIG. 5 is a simplified block diagram of the descrambler of the system.

Referring now to FIG. 5, the composite signal to be processed at the descrambler is distributed to the respective video and audio paths by a distribution amplifier 30, and is separated into video and audio components through appropriate filters 31, 32. The video path, which is analogous to its counterpart in the scrambler, comprises the low pass filter 31, an input clamping amplifier 33, an A/D converter 34, a sync generator 35, a video processor 36, a controller 37, a control data decoder 38, a D/A converter 39 and an output amplifier 40. As in the scrambler, the video section also includes a blanking regenerator 41. However, in this case decoding circuitry replaces the data encoding circuitry of the scrambler. The decoded data is passed to the controller 37, decrypted and then used to control the video processor 36. As shown in FIG. 5, automatic gain and set-up control are provided by the controller 37 for the input clamping amplifier 33.

The audio subcarrier, separated by the bandpass filter 32, is demodulated by the subcarrier demodulator 42 and passed to the audio processor 43. The audio processor 43, under the control of controller 37 with decryption keys, descrambles and separates the three audio channels. The descrambled data of each channel is fed to a respective one of three separate D/A converters 44 and thence to a respective output amplifier 45 providing a balanced audio output. In cases where PAM audio is used, the PAM data is extracted from the A/D converter 34 by the audio processor 43.

A bypass 46, controlled by switches 47, 48 is provided for bypassing the descrambler in cases where the composite video input signal is not scrambled. If the controller does not detect an encryption signal it causes the switches 47 and 48 to switch to the bypass mode and the input signal passes directly to the standard receiving equipment.

Scrambler Organization

Figure 6:
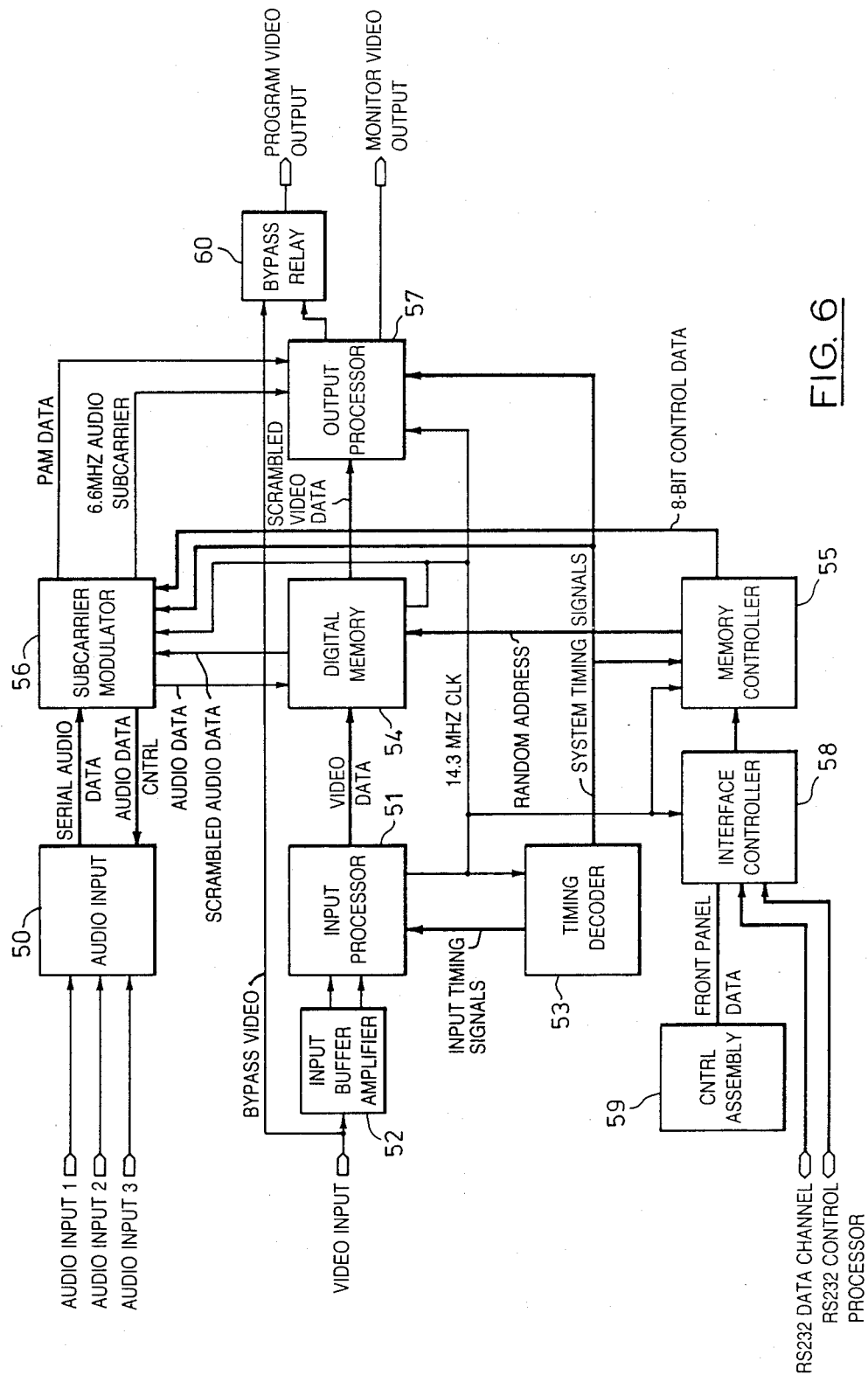
FIG. 6 is a block diagram showing the actual organization of the scrambler.

Referring to FIG. 6, the scrambler is organized as a number of interconnected circuit boards designated as follows:

Audio Input, 50, which receives analog audio signals from three channels and generates serial audio data therefrom;

Input Processor, 51, which receives analog video input via an Input Buffer Amplifier 52, and generates video data therefrom;

Timing Decoder 53, which generates the system timing signals;

Digital Memory 54, which under the control of Memory Controller 55 stores and scrambles the video and audio data;

Audio Modulator 56, which in accordance with the scrambled audio data generates a modulated audio subcarrier and PAM data;

Output Processor 57, which receives and processes the scrambled data;

Interface Controller 58, which interfaces the system with a front panel Control Assembly 59, an RS232 Data Channel, and an RS232 Control Processor (if required).

A bypass relay 60 is provided for bypassing the video path of the scrambler when required.

The front panel control assembly 59 provides a manual switch which, when actuated, operates the bypass relay 60 so that the video input will pass to the output unaltered. The front panel also provides an array of thirty-two selector switches for selectively enabling or disabling the various descramblers of the network. A descrambler is disabled if it does not receive decryption data which is specifically addressed to it. Alternatively, or in addition, address information for the various descramblers may be provided from the RS232 Control Processor. Thus, the Control Processor knows at any time which of the various users are authorized to receive the decryption data and ensures that the Memory Controller 55 will receive appropriately addressed keys to enable them to receive it. The Memory Controller 55 in turn passed that information on to the Output Processor 57 from processing and transmission.

Figure 7:
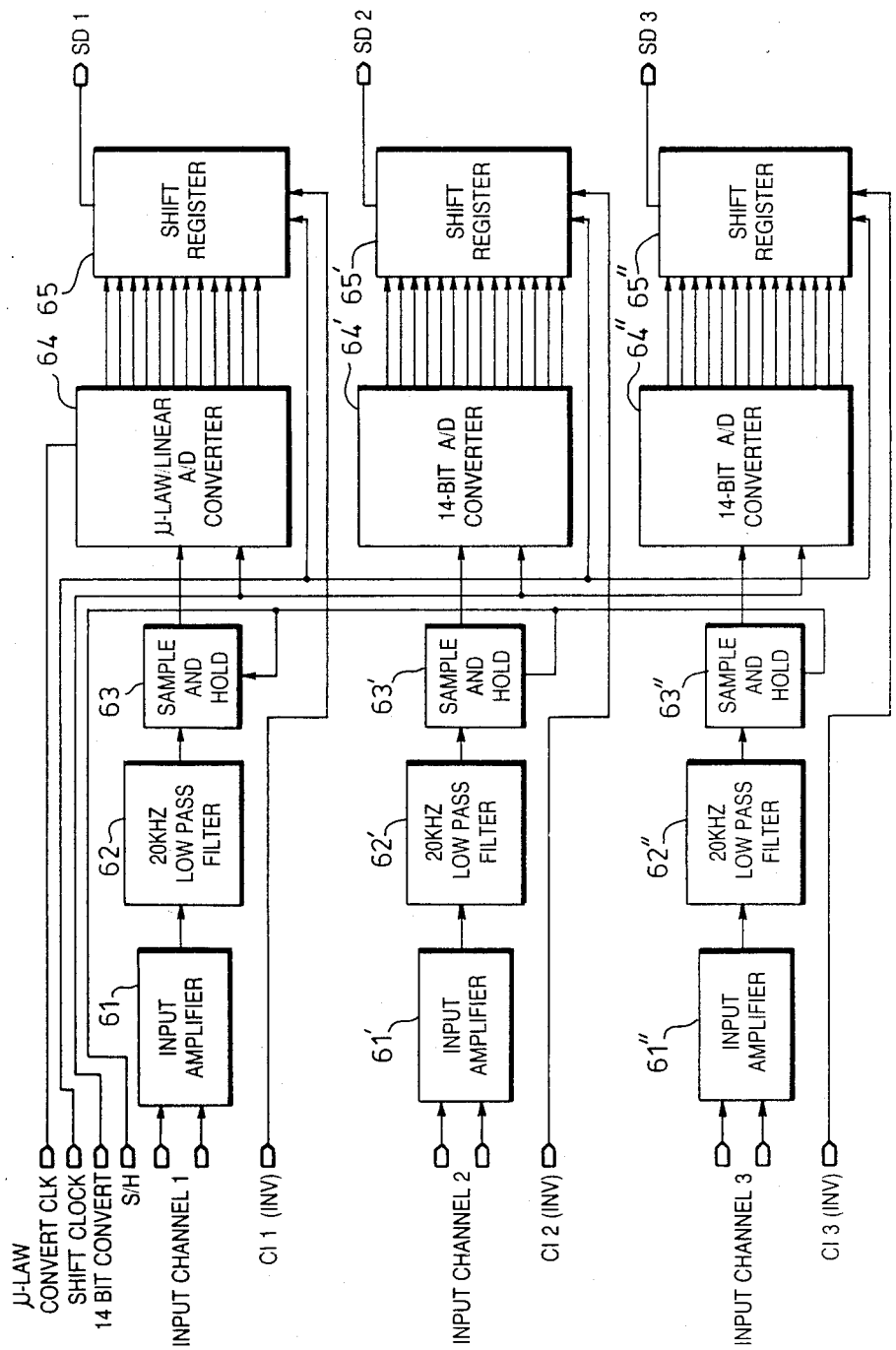
FIG. 7 is a block diagram of the Audio Input of FIG. 6.

FIG. 7 shows the circuitry of the Audio Input board 50. The circuitry comprises three sections for processing the audio input of the three channels, which are respectively labelled "Input Channel 1", "Input Channel 2" and "Input Channel 3". Each audio section comprises an input amplifier 61 (or 61', 61"), to which the audio input is applied, a 20 KHz low pass filter 62 (or 62', 62"), and a sample and hold circuit 63 (or 63', 63") which samples the audio in preparation for digitizing by an A/D converter 64 (or 64', 64"). In the system described herein, the A/D converter 64 is an 8-bit $\mu$-law converter, or optionally a 12-bit linear converter, while the A/D converters 64' and 64" are 14-bit linear converters for high quality audio reception over the second and third channels. The outputs of the A/D converters are latched into shift registers 65, 65' and 65" eight (twelve) or fourteen bits at a time, from which they are clocked out serially as audio data SD1, SD2 and SD3.

Figure 9:
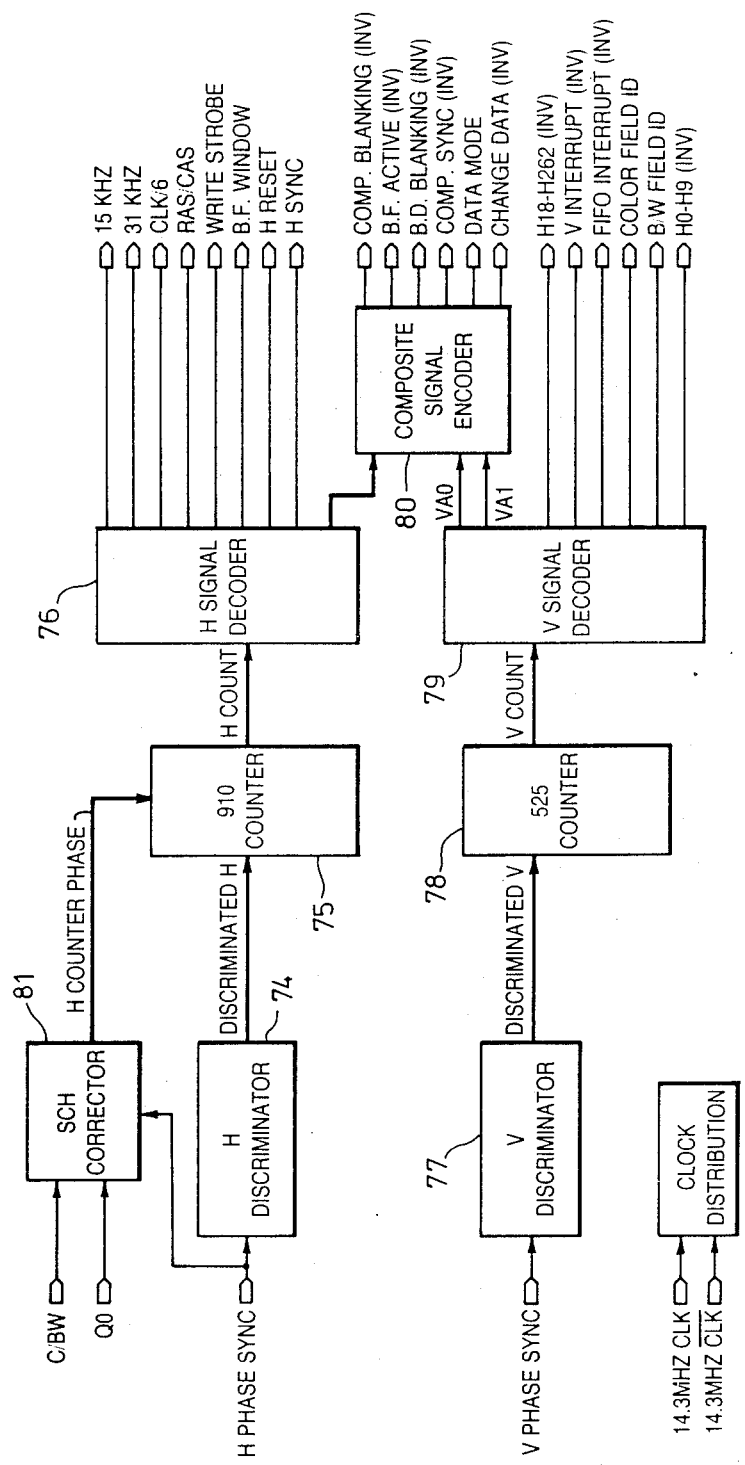
FIG. 9 is a block diagram of the Timing Decoder of FIG. 6.

The sample and hold circuits 63, 63' and 63" are clocked by a signal S/H from the timing decoder (FIG. 9). The A/D converters are clocked by a signal 14-BIT CONVERT from the timing decoder, the converter 64 also being clocked by a signal $\mu$-LAW CONVERT also from the timing decoder. The shift registers 65, 65' and 65" are controlled by a SHIFT CLOCK signal and respective clock inhibit signals CI1, CI2 and CI3 which are timing signals from the timing decoder board (FIG. 9).

Figure 8:
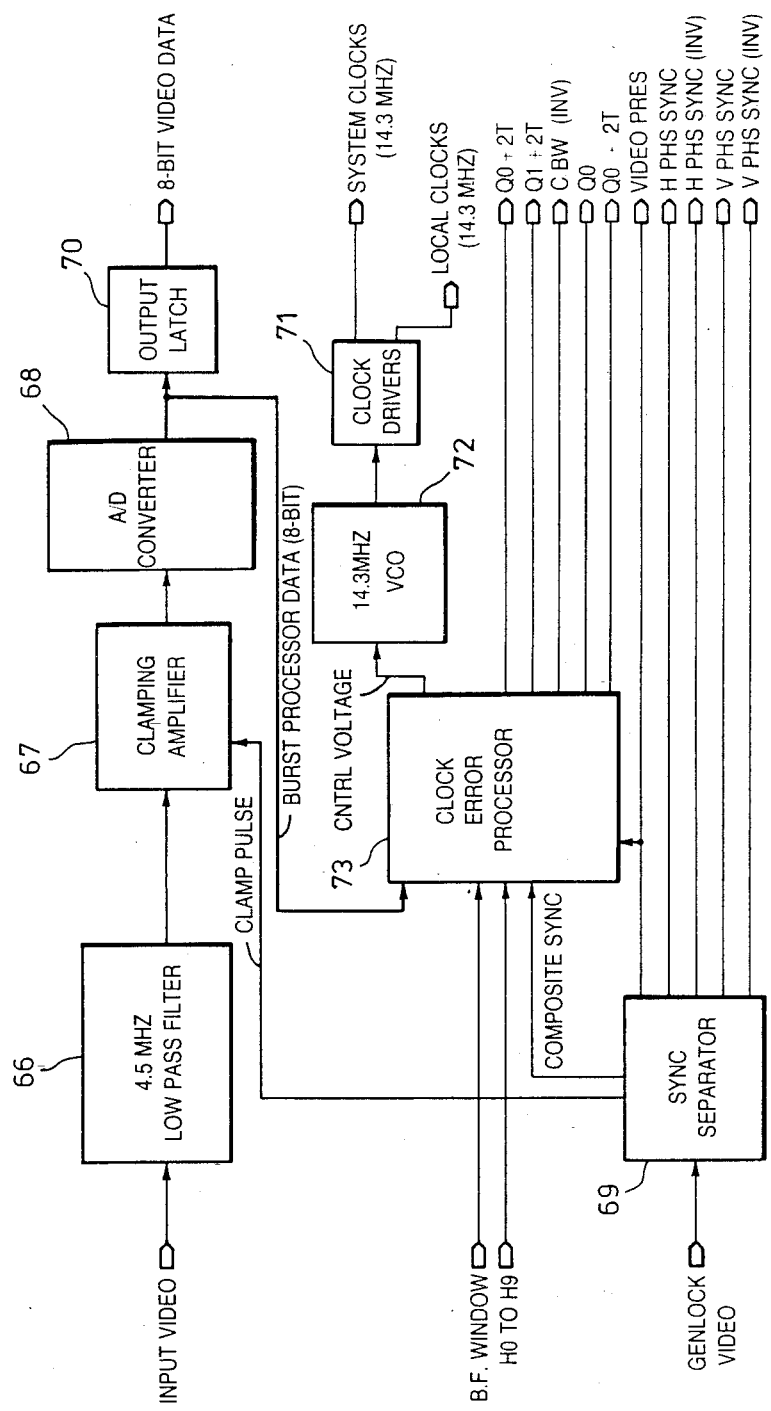
FIG. 8 is a block diagram of the Input Processor of FIG. 6.

FIG. 8 is a block diagram of the Input Processor board 51 of FIG. 6. The INPUT VIDEO from input buffer amplifier 52 (FIG. 6) is filtered by a 4.5 MHz low pass filter 66, the filtered video being D.C. restored by a clamping amplifier 67 and digitized by an A/D converter 68. The digitized video next passes to the Digital Memory (FIG. 10) via an output latch 70. A sync separator 69 also receives the input video, denoted here by GENLOCK VIDEO, and separates the sync pulses from the video signal and derives therefrom:

a back porch clamping pulse derived from the trailing edge of H SYNC for control of the clamping amplifier 67;

a signal denoting that video is present in the input, VIDEO PRES;

V PHS SYNC (vertical phase sync);

H PHS SYNC (horizontal phase sync);

Inversions of these two sync signals;

COMPOSITE SYNC (i.e. all sync pulses stripped from the video). The system clocks and local clocks at 14.3 MHz, (four times the color subcarrier frequency) are driven by clock drivers denoted by the block 71, from a 14.3 MHz voltage controlled oscillator 72. It is important that the system timing be locked to the color subcarrier frequency, and to ensure this the oscillator 71 is controlled by a circuit 73 referred to herein as the Clock Error Processor.

The clock error processor 73 recognizes when video is present by the VIDEO PRES SIGNAL from the sync separator 69, and produces the requisite output signals from the following control signals:

COMPOSITE SYNC, from the sync separator 69;

BURST PROCESSOR DATA (8-BIT) representing the digitized video data from the A/D converter 68;

B.F. WINDOW (or Burst Flag Window) derived from the timing decoder (FIG. 9) and representing an instruction to start looking for color burst;

H0 to H9 (INV) derived from the timing decoder (FIG. 9) and identifying the vertical sync.

Besides controlling the oscillator 71 the clock error processor derives from these signals a control signal C/BW used by the timing decoder, which signal is low for color and high for black and white, Q0 which is a timing signal at half the clock frequency, 14.3 MHz:2, Q1+T which is a timing signal at one quarter the clock frequency and delayed by one quarter of a cycle, and control signals Q0+2T and Q1+2T. The latter signals are used by the output processor to identify color fields.

Figure 8A:
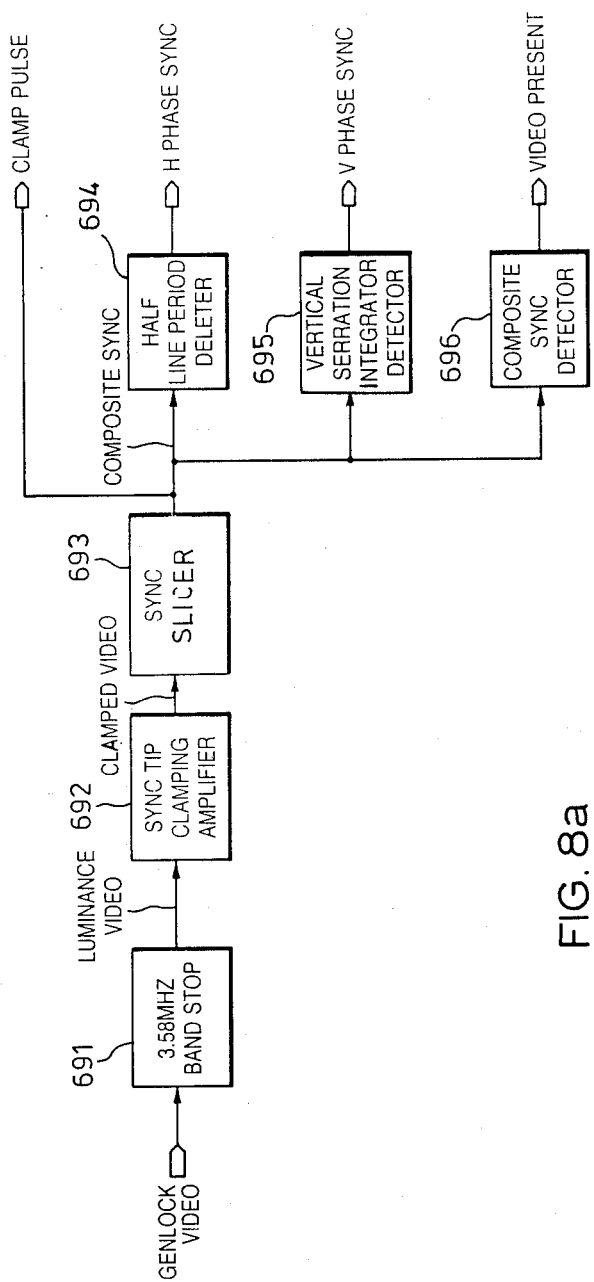
FIG. 8a is a block diagram of the Sync Separator of FIG. 8.
Figure 8B:
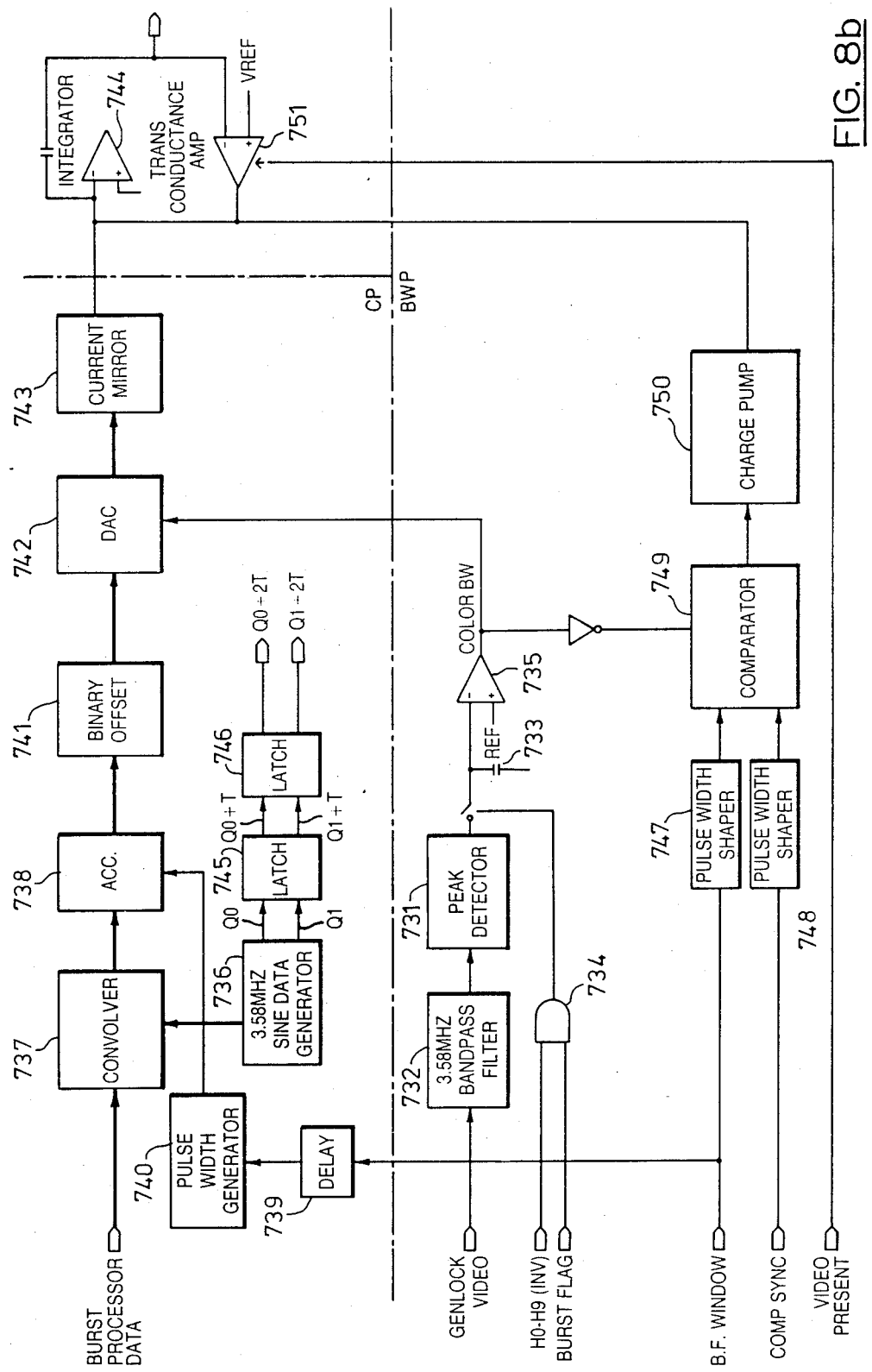
FIG. 8b is a block diagram of the Clock Error Processor of FIG. 8.

The sync separator 69 and the clock error processor 73 are illustrated in more detail in FIGS. 8a and 8b, respectively. Referring first to FIG. 8a, the sync separator extracts timing information (H PHASE SYNC and V PHASE SYNC) from the incoming video. First, the incoming GENLOCK VIDEO passes through a 3.58 MHz band stop filter 691 which removes color burst from the back porch, thereby allowing the back porch to be used as a blanking voltage reference point. This signal is then clamped by a clamping amplifier 692 with the lowest voltage of sync, clamped to a reference level. A Sync Half Voltage Detector 693 then detects when this clamped video voltage goes below the mid-voltage half way between sync tip and back porch voltage. The resulting signal is COMPOSITE SYNC from which are derived the back porch clamp pulse and the two system synchronization pulses (H PHASE SYNC and V PHASE SYNC).

H PHASE SYNC is extracted from COMPOSITE SYNC by a Half Line Period Deleter 694. V PHASE SYNC is extracted by means of a circuit 695 which integrates the COMPOSITE SYNC and detects the lowest integrator output which identifies vertical serrations. A Composite Sync Detector 696 also derives from COMPOSITE SYNC the VIDEO PRESENT signal which is an indication that synchronization pulses are present.

The function of the clock error processor 73 is to generate a control voltage for the voltage controlled oscillator 72 by analyzing the color burst, if present, or horizontal sync if absent. Referring to FIG. 8b, the processor begins by sensing the presence of color burst, and this is achieved by extracting the color information by passing the GENLOCK VIDEO through a 3.58 MHz bandpass filter 732 to a peak detector 731 which detects the envelope. The envelope is sampled and held by sampling circuit 733 during the burst time. It is flagged by gating the signal H0–H9 (INV) with the signal BURST FLAG by gate 734. The output of the sample and hold circuit 733 is compared against a reference by comparator 735, to generate a signal designated COLOR/BW which, if high, indicates the presence of color burst. This signal is used to activate one of two processing paths. If color burst is present, the processing path designated by the reference CP is activated. If color burst is absent, the processing path denoted by the reference BWP is activated.

The process begins by taking the 14.3 MHz clock and generating a digital data stream representing a sinusoidal wave at 3.58 MHz (i.e. 14.3 MHz divided by 4) from the sine data generator 736. The generated output is convolved in convolver 737 with BURST PROCESSOR DATA generated by the A/D converter 68 (FIG. 8) which represents the sampled input video. The result of the convolution is accumulated in an accumulator 738 during the color burst time as specified by a Processor Enable signal which is derived from B.F. WINDOW by delaying it in delay circuit 739 and defining its width to be equal to four cycles of the 3.58 MHz sinusoidal waveform in the pulse width generator 740.

The output of the accumulator 738 is 2-complement data representing the phase error of the 3.58 sine wave derived from the sine data generator 736 (which has a fixed relationship to the system clock) and the color burst of the input video. The resultant output of the accumulator 738 is converted by binary offset 741 to an offset binary representation and then to a current via a D/A converter 742. The latter has been enabled by the signal COLOR/BW generated from the comparator 735.

The inverting output of the D/A converter 742 is current mirrored and summed with the non-inverting output in current mirror circuit 743 trimmed to form a single ended current output such that if the output of accumulator 738 has a numerical value of zero (i.e. no phase error) the summed output of the current mirror circuit 743 is also equal to zero current. The output of the current mirror circuit 743 is integrated by integrating circuit 744 to form a control voltage for the voltage controlled oscillator 72 (FIG. 8) in such a way as to lock the 14.3 MHz frequency to color burst. Defining the sine wave generated by sine data generator 736 at different phase angles, results in shifting phase of the system clock with respect to the incoming color burst, this yielding a method of controlling the color phase.

Additional signals generated by the generator 736 are Q0 and Q1, the frequencies of which are 14.3 MHz/2 and 14.3 MHz/4 respectively. These signals are delayed by latch 745 to form signals Q0+T and Q1+T. They are further delayed by latch 746 to form signals Q0+2T and Q1+2T. The signals are used by the rest of the system for timing purposes.

If the COLOR/BW signal is low, i.e. if the color burst is absent, the processor portion BWP is activated and the processor CP is deactivated. The purpose of this is to derive an error on the basis of composite sync (COMP SYNC) which has been separated from the incoming video, and a horizontal reference BF window generated by dividing the system clock 14.3 MHz by 910. The process starts by taking the leading edge of BF window and generating a pulse of 2T width in pulse width shaper 747. The pulse width shaper 748 operates in the same manner on signal COMP SYNC, but producing a pulse of width T. The two pulses are compared in phase by the comparator 749 and the relative overlap is converted to current by a charge pump 750. Zero current is produced by the charge pump if the leading edges of the two pulses are in alignment; otherwise, positive or negative current is produced depending on the direction of misalignment. As in the previous case, the current produced by charge pump 750 is converted to voltage by integrator 744 for controlling the voltage controlled oscillator 72 (FIG. 8). If the video signal is absent, the current for the integrator 744 is produced by a transconductance amplifier 751 which has been enabled by the VIDEO PRESENT signal. The current is produced in such a way as to bring the output voltage of the integrator 744 to a level equal to the reference voltage VREF, which is one of the inputs to the amplifier 751. Its function is to center the voltage controlled oscillator in the absence of video, thus allowing a quick recovery when the signal becomes present. Referring now to FIG. 9, the timing decoder comprises essentially an H signal processing section, a V signal processing section, and composite signal encoder. The H signal processing section comprises an H discriminator 74 which receives the H PHASE SYNC signal from the sync separator 69 of the input processor (FIG. 8) and checks for valid H PHASE SYNC. The discriminated H is fed to a 910 counter 75, where 910 represents the number of samples taken per line of video, and the output of the counter is decoded by an H signal decoder 76 to provide a first group of timing signals which will be identified below.

The V signal processing section comprises a V discriminator 77 which receives the V PHASE SYNC signal from the sync separator 69 and checks for valid V PHASE SYNC. The discriminated V signal is fed to a 525 counter 78, where 525 represents the number of half lines in one field of video ($2 \times 262\frac{1}{2}$), and the output of the counter 78 is decoded by a V signal decoder 79 to provide a second group of timing signals. H signals from the decoder 76 are multiplexed with video data signals VA0 and VA1 from the decoder 79 by a composite signal encoder 80, the output of which is represented by a third group of composite signals.

The purpose of the H discriminator is to allow a discriminated H output to load the 910-counter only if sixteen valid H PHASE SYNC signals have been received in a row. To achieve this, the H PHASE SYNC loads a 910-counter. The counter counts 910 at 14.3 MHz, which is one scan line, and outputs an enable to allow the next H PHASE SYNC to be passed through. If an invalid H PHASE SYNC signal occurs, the 910 counter is reloaded and will not allow the next H PHASE SYNC to be passed to the next counter. The counter looks for sixteen valid H PHASE SYNC signals and then generates the discriminated output. When an invalid H PHASE SYNC occurs, the counter is reset.

The V discriminator 77 operates in a similar manner, but the count length is 525 at 31 KHz (twice each line scan) instead of 910 at 14.3 MHz. The 525 counter counts at the vertical scan rate and only allows a discriminated V output if the output of the 525 counter occurs at the same time as the incoming V PHASE SYNC. The discriminated V output loads the counter 78.

An SCH (Subcarrier to Horizontal) corrector 81 is connected between the H PHASE SYNC input to the H discriminator 74 and the counter 75, its function being to monitor and correct the timing relationship between the horizontal sync pulses and the color burst. Control signals for the SCH corrector 81 comprise the signal C/BW from the input processor (FIG. 8) which signals a color burst, and the signal Q0 at half clock frequency (14.3 MHz/2). The first group of timing signals referred to above includes the following:

- 15 KHz, which is the line frequency;
- 31 KHz, which is the half-line frequency for controlling the 525 counter 76;
- CLK/6, where CLK is 14.3 MHz;
- RAS/CAS, which is a signal at CLK/6 frequency for controlling the Memory; RAS signifies "Row Address Select" and CAS signifies "Column Address Select";
- WRITE STROBE, which is a strobe signal at CLK/6 frequency for the Digital Memory;
- B.F. WINDOW, which denotes the position of a color burst, and lasts for the duration of the color burst to inform the burst error processor 73 (see FIG. 8) where to start processing;
- H RESET, which denotes the end of the 910 counter of counter 75;
- H SYNC, which is a signal at 15 KHz rate denoting the position of the horizontal synchronization pulse.

Figure 13:
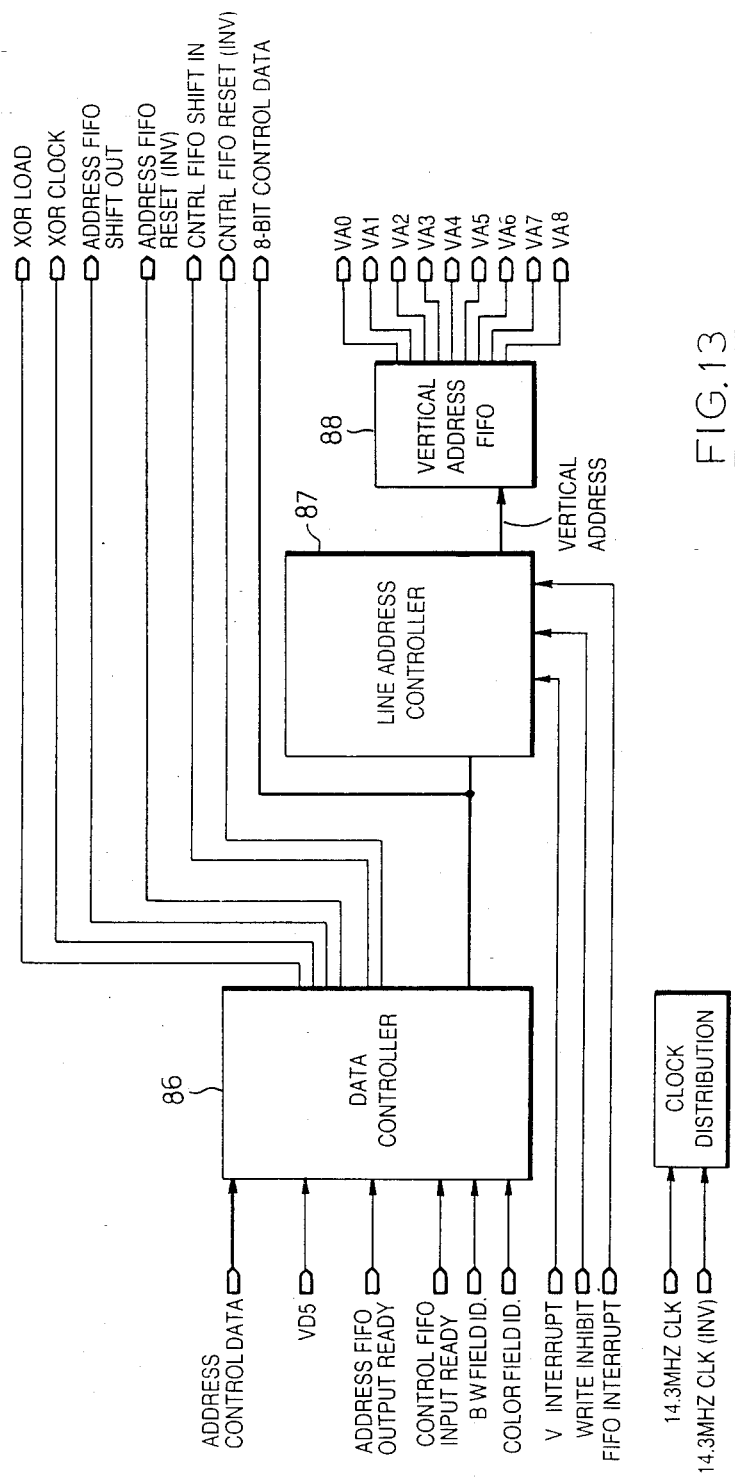
FIG. 13 is a block diagram of the Memory Controller of FIG. 6.

The second group of signals includes the following:
- H18-H262 denoting the horizontal lines with which audio data is sent;
- V INTERRUPT, which occurs during the vertical interval between equalizing pulses;
- FIFO INTERRUPT, as with the V INTERRUPT, this signal controls the line address controller of the memory controller (FIG. 13). The signal defines a time in which to load the vertical address memory (FIG. 13);
- COLOR FIELD I.D. and B.W. FIELD I.D. which two signals identify the particular color field being processed for the memory controller (FIG. 13);
- H0-H9, which identifies the vertical sync.

Figure 14:
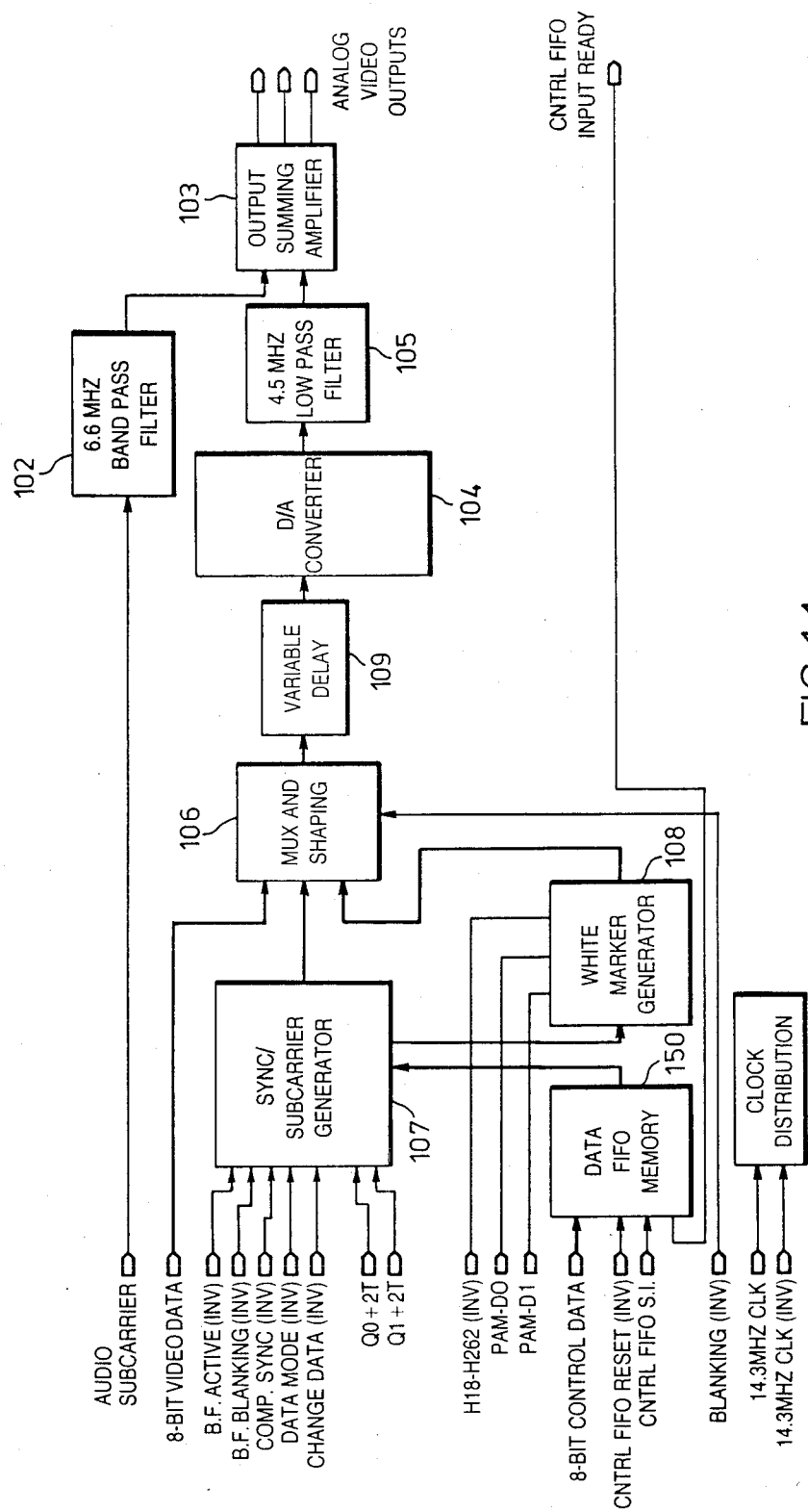
FIG. 14 is a block diagram of the Output Processor of FIG. 6.

The third group group of signals are those generated by the composite signal encoder 80 by combining the horizontal (H COUNT) and vertical (V COUNT) signals. These signals include:
- COMP. BLANKING (i.e. Composite Blanking) which, when low, indicates that there is no active video present. The signal is used to command the output processor 57 (FIG. 6) to insert new blanking information;
- B F. ACTIVE, which occurs during lines 10–262 and controls the generation of color burst;
- B.F. BLANKING, which occurs during the equalizing pulses periods, lines 1–3 and 7–9;
- COMP. SYNC, which is the composite of H sync and V sync;
- DATA MODE which defines times between equalizing pulses for insertion of control data by the output processor 57;
- CHANGE DATA, which occurs during pre-equalizing and post-equalizing pulses and initiates phase changes for the encoding of data by the output processor (FIG. 14).

FIG. 10 illustrates the digital memory board 54 (FIG. 6) at which the video data from the input processor 51 and the audio data from the audio input board 50 are reassembled in essentially random patterns in respective memories. The scrambling is achieved by segmenting the incoming data (video data and associated audio data) on a line by line basis, a half line by half line basis, a pixel by pixel basis, or a frame by frame basis. In the present example the information is scrambled on a line by line basis.

Referring to FIG. 10, the memory board comprises a 384K × 8-Bit memory array 82, which receives the 8-bit video data line by line and stores the lines of information at randomly selected address locations in accordance with coded address data VA0 to VA8 from the memory controller 55 (FIG. 6), which contains the scrambling pattern. The pattern is changed four times for every frame of video, each random pattern being replaced by another randomly selected pattern The board also comprises a 64K × 1-Bit memory 83 which receives the serial audio data, the latter being stored at randomly selected address locations in accordance with the same address information as is received by the video memory.

An address counter/multiplexer 84 performs two functions. It serves as an address generator for the pixels (picture elements) within a line, and it serves also as a multiplexer to combine the pixel address with the line address (VA0 to VA8) in a format required by the video frame memory array 82. The video frame memory array 82 is organized to store simultaneously line segments of six pixels per memory cycle, and thus requires 128 address cycles per line by 512 lines. This translates to 7 bits of line segment address by 9 bits of line address, or a total of 16 bits to address any group of 6 pixels. Memory array 82 is implemented with dynamic RAM memory which requires two address cycles, namely RAS (Row Address Select) and CAS (Column Address Select), each being 8 bits for a total of 16 bits. Therefore, the address counter/multiplexer 84 is used to generate the pixel address and multiplex it with the VA0–VA8 line address via the control of Line Segment Address Strobe, which when high selects the 8 bits for the RAS and when low selects CAS, and the transition of high to low increments the segment counter at the same time.

The block 85 designated "Cntrl Signal Logic and Drivers" is used to increase the power driving capability of the multiplexer in order to drive the memory 82, and secondly generates the appropriate memory control signals (RAS, CAS, WRITE ENABLE). The memory address bus which is the output of the block 85 is the buffered result of the output of component 84.

The video frame memory array 82 of FIG. 10 is composed of eight identical blocks (in the case of an 8-bit processing) where each block stores 1 bit of video data. If, for example, 9-bit video data were required for higher quality, nine blocks would be used. This is valid for any word width.

Figure 10A:
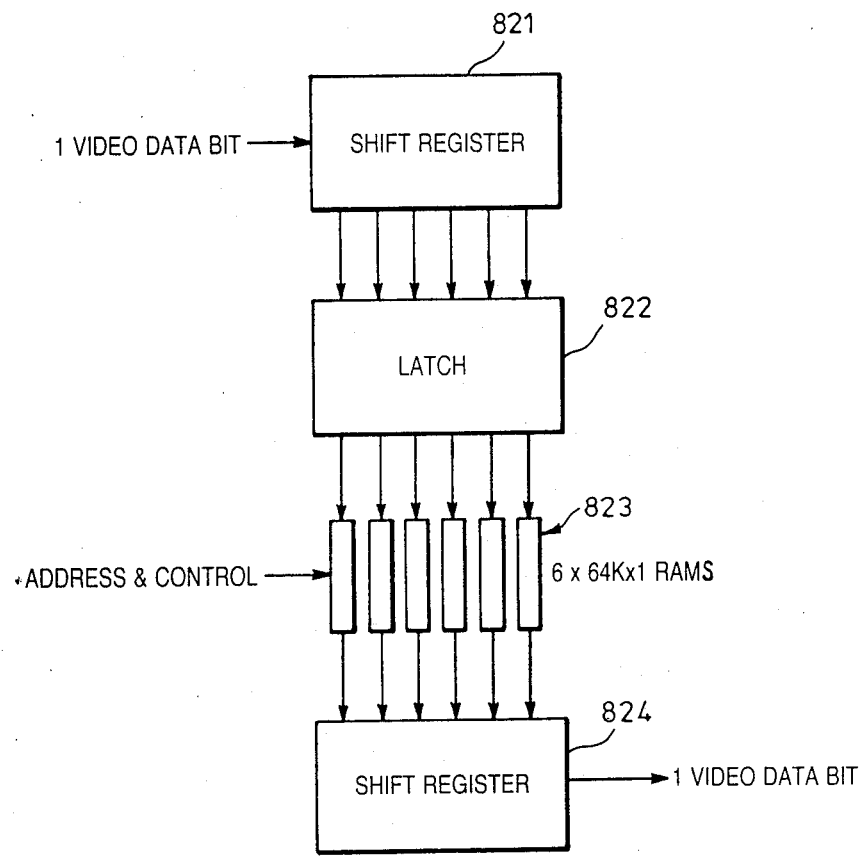
FIG. 10a is a block diagram showing a detail of the memory of FIG. 10.

Referring to FIG. 10a, each block is composed of a 6-bit shift register 821 in which six pixels of video are accumulated and, once accumulated, they are stored in a temporary latch 822 while the next block is shifted in. Next, six 64k × 1 bit RAMs 823 are addressed and the RAS/CAS cycle is initiated by the unit 85 of FIG. 10, resulting in the data for the specified address appearing on the output which in turn is loaded into an output shift register 824.

Once the data is transferred into the output shift register 824, new data is loaded into the RAM 823 from latch 822 by bringing the WRITE ENABLE low for one clock cycle. This process is repeated every six 14.3 MHz clock cycles. There is thus an uninterrupted flow of data into and from the memory. The RAM address is pre-calculated by a RAM address controller, (Line Address Controller 87 of FIG. 13), in such a way as to scramble the video data with a random but predetermined pattern. The memory is operated in a read-modify-write cycle mode, meaning that by specifying an address, the data is read from the RAM and that location is written with new data without changing the address for that specific cycle. This results in an almost 2 to 1 improvement in memory cycle rate over an organization in which independent read and write cycles are used.

The coded address data VA0 to VA8 is received from the memory controller 55 (FIG. 6), which thus determines the random selection of the memory address locations. In accordance with the code for encrypting the video and audio data the memory controller must also generate control data by which the scrambled information can be decrypted by the descramblers of the authorized receiving units. Referring to FIG. 13, the memory controller basically comprises a data controller section 86, a line address controller section 87, and a FIFO memory 88 which receives vertical address information to produce the vertical address control data VA0 to VA8. The data controller 86 receives and decodes the following signals:

ADDRESS CONTROL DATA, together with ADDRESS FIFO OUTPUT READY, from the interface controller 58 (FIG. 6). The ADDRESS CONTROL DATA incorporates the user address control information for the descrambler;

VD5, which is a video data bit selected from the incoming video data and therefore having a random value;

CONTROL FIFO INPUT READY, received from the output processor 57 (FIG. 6);

B/W FIELD I.D. and COLOR FIELD I.D., received from the V signal decoder 79 of the timing decoder (FIG. 9), which is sent to the descrambler.

The resultant output signals of the data controller are as follows:

XOR LOAD, which controls the audio modulator 56 (FIG. 6) (random XOR circuitry);

XOR CLOCK, which is also a control signal for the random XOR circuitry of the audio modulator 56;

ADDRESS FIFO SHIFT OUT, which is a shift control signal for the interface controller 58 (FIG. 6);

ADDRESS FIFO RESET, which is a reset signal used by the interface controller;

CONTROL FIFO SHIFT IN and CONTROL FIFO RESET which control the data FIFO memory of the output processor 57 (FIG. 6).

Thus, the data controller 86 receives addressing and control information from the Front Panel/Computer Interface. This data is encrypted through a software implementation of the DES algorithm in the data controller. The data controller randomly selects a scrambling pattern through use of the video data bit VD5, which is passed to the line controller 87 and is also encrypted by DES for transmission to the descrambler. The addressing information is encrypted, providing an addressing rate of approximately 14,400 per second, and along with Field IDs and scrambling control, is sent to the QPSK modulator 94 (FIG. 11).

The data controller 86 also produces the 8-bit XOR encryption data DCD0 to DCD8 for the audio modulator (FIG. 11). The control data is also fed to the line address controller 87, from which the vertical address signals VA0 to VA8 incorporating the scramble pattern are derived.

The Line Address Controller 87 receives random pattern data from the Data Controller 86. This processor emulates the configuration of the video memory 82 in software to achieve the scrambling pattern. The program in the controller transforms the scrambling pattern into the read-modify-write structure of the video memory. This address pattern is read out with respect to the FIFO INTERRUPT signal, thus creating a 9-bit vertical address (VA0–VA8) which is synchronized through the vertical address FIFO 88. This emulation reduces the processing power needed at the descrambler. Both controllers 86 and 87 are interrupted every vertical interval to start each process. The process is exemplified as follows.

In order to illustrate the principle of the scrambling process using a read-modify-write memory cycle, reference will be made to the scrambling of four lines of video. If the random four-line pattern consists of four numbers 3-1-2-4 which form a vertical address and are sent to the memory via a 9-bit address lines (VA0–VA8), this will result in storage of the first video line into column 3 of the video memory, a column having enough storage for one line of video (768 bytes) Similarly, the second video line is stored into column 1, the third video line is stored into column 2, and the fourth video line is stored into column 4 On the next read-modify-write memory cycle the memory is addressed sequentially, i.e. the address consists of four consecutive numbers 1-2-3-4. This results in reading the second video line previously stored in column 1, next the third video line from memory column 2, and similarly the first and fourth video lines from columns 3 and 4. Therefore the video sent via the transmission link to the descrambler has the order 2-3-1-4. At the same time, along with the video, the pattern 3-1-2-4 is sent in an encrypted format. The descrambler writes the scrambled video into the descrambler memory with a sequential address. Therefore the first video line, which is actually the second line of the original video, is stored in column 1 of the video memory, and the third, first and fourth actual video lines are stored in columns 2, 3 and 4 respectively. On the next read-modify-write descrambler memory cycle, the memory is addressed with the random pattern 31-1-2-4 which was recovered from the transmitted video and decrypted with the appropriate KEY. This results in reading the video data stored in memory columns 3-1-2-4, consequently yielding reordering of the video to the original line order.

The process of write random/read sequential in the scrambler and write sequential/read random in the descrambler could alternatively be read random/write sequential and read sequential/write random, allowing for continuous storage and retrieval for every memory cycle. The scrambler must delay the incoming signal three half fields since the descrambler has only enough memory for a half field delay. This illustration shows that by addressing the memory by only a sequential count, a delay equal to the length of the count will result. Also, if the row address of the memory (controlling storage sequences of the pixels within a video line) is controlled in the same fashion as the column addressing, the resultant video is scrambled in both the horizontal and vertical directions.

Referring now to FIG. 11, the audio modulator is concerned with the processing of audio data from the audio input board 50 (FIG. 6), producing timing signals for the further processing of the audio data, routing audio data to and from the audio memory 83 (FIG. 10) at which it is encrypted in accordance with the address information by which the related video data is encrypted, and deriving a phase modulated digital audio subcarrier and pulse amplitude data.

The three channels of serial audio data SD1, SD2 and SD3 from the audio input board 50 (FIG. 6) are multiplexed by multiplexer 89, under the control of an audio input timing control circuit 90, the multiplexed data being fed serially into a FIFO memory 91. The time division multiplexing of these channels is effected under the control of the CLOCK INHIBIT signals CI1, CI2 and CI3 (see FIG. 7). The data from the FIFO memory 91 passes to a CRC redundancy encoder 92 where it is subjected to cyclic redundancy encoding. The encoder 92 further effects a preliminary scrambling of the audio data, in accordance with BIT SCRAMBLE DATA received from the parallel/serial converter 93. The bit scramble pattern is determined by the pattern DCD0 to DCD7 of 8-bit control data and control XOR LOAD received from the data controller 86 (FIG. 13).

The CRC Redundancy Encoder (FIG. 11a) is implemented as a state generator, but instead of using shift registers and exclusive OR gates, an EPROM 921 and a latch 922 are used. Six feedback lines from the latter to the former provide up to a six bits check word. As each bit is input into the state generator, it is XORed in the EPROM 921 and shifted out as a state in one of the feedback lines. Each time a bit is shifted in, another feedback line is used. These six lines contain the check word After the data block has been shifted in, the check word is shifted out by placing the EPROM in a reverse shift mode. An extra input on the EPROM allows the data to be inverted (XORed) to achieve a bit scramble.

The audio input timing control 90 uses time division multiplexing to combine the three audio channels in a serial manner. This is done by selecting audio channel #2 (SD2) by enabling CI2. 14-bits of data are loaded into the FIFO memory 91. Next, channel #3 (SD3) is loaded for 14-bits, and then channel #1 (SD1) for 12-bits. This FIFO has two functions. First, the FIFO 91 inputs data at a 44.1 KHz rate (four times color subcarrier frequency divided by 325) for each set of audio samples and outputs data at a three set of samples per one horizontal scan (15 KHz) rate. Second, the FIFO 91 accumulates data during vertical when no audio data is being transmitted. A sync bit is input into the FIFO to frame the output of the FIFO memory 91 into groups of sampled data.

An additional memory is provided after the CRC encoder 92 to scramble the audio data for the PAM option. MA0-MA8 controls the memory. This data goes to the output processor for pulse amplitude modulation during the H blanking interval (HBI). Timing signals are derived from counters and PROMs, which are clocked at 14.3 MHz, or a divided-down rate of 14.3 MHz.

The encoded audio data passes from the CRC redundancy encoder 92 to the audio memory 83 (FIG. 10) where it is further scrambled before further processing by the audio modulator.

The timing of this preliminary processing is controlled by the audio input timing control 90, which produces the requisite timing signals from the following input signals H18 to H262 from the timing decoder (FIG. 9) representing the portion of the video signal which will carry the audio subcarrier, 15 KHz from the timing decoder, representing the line frequency, CLOCK/6 from the timing decoder, and H0-H9 from the timing decoder, identifying the vertical sync. The timing signals from the audio input timing control control the multiplexing of incoming data and feeding it into the audio data FIFO 91, the clocking of data into the CRC redundancy encoder 92, and the parallel/serial converter 93. Other timing signals S/H, CI1, CI2, CI3, $\mu$-Law Convert, 14-Bit Convert, and Shift Clock, control the data processing of the audio input board as previously described.

The scrambled audio data from the audio memory 83 is fed to a digital subcarrier generator and phase modulator 94 via a 2-Bit latch 95. The two bits of data AD0 and AD1 define four possible states, and hence four phase quadrants of the audio subcarrier. The timing of the phase modulated subcarrier is determined by the 14.3 MHz clock, derived from the color subcarrier frequency, to which all other timing of the system is locked The audio subcarrier is derived, under the control of a timing control circuit 96, from a 26 MHz oscillator 97, 26 MHz being four times the audio subcarrier frequency of a 6.6 MHz. The 26 MHz oscillator 97 is phase locked to the 14.3 MHz clock, by a feedback circuit including a phase comparator 98, the two clock frequencies being reduced to a common frequency for the phase comparison by a "Divide by 13" frequency divider 99 and a "Divide by 24" frequency divider 100. The digitized data representing a phase modulated subcarrier is fed from the generator and phase modulator 94 to a D/A converter 101.

As shown in FIG. 14, the phase modulated audio subcarrier is filtered by a 6.6 MHz bandpass filter 102 and applied to one input of an output summing amplifier 103, from which the composite analog outputs are derived Another input of the summing amplifier 103 receives the video signal after it has been converted to analog form by a D/A converter 104 and filtered by a 4.5 MHz low pass filter 105.

The 8-bit scrambled video data from the memory 82 (FIG. 10) is passed to a multiplexer and shaping circuit 106 (FIG. 14), where it is multiplexed with the regenerated blanking data and control data subcarrier from sync/subcarrier generator 107 and with white marker and PAM data from white marker generator 108. The multiplexer and shaping circuit 106 is controlled by the blanking signal BLANKING (INV) from the timing decoder 80 (FIG. 9). The blanking signal selects scrambled video data when it is present or, alternatively, sync subcarrier or white marker. The shaping circuit 106 serves the additional purpose of avoiding hard switching which would cause ringing and excessive noise. This is achieved by multiplying the transitions during switching times by sine-squared coefficients.

The white marker generator 108 has two functions. First, it generates the white marker signal which provides a white reference level to be used by the descrambler for automatic gain control. Second, it converts the pulse amplitude audio data PAM-DO etc. to a multi-level pulse amplitude signal which is inserted in the horizontal blanking. Transitions between pulses have an integrated raised cosine shape in order to minimize the transmission spectrum required.

The sync/subcarrier generator 107 is used to generate data representing composite sync, blanking level, and color burst at the times specified by control signals COMP SYNC., Q0+2T, Q1+2T. In addition it is a QPSK (Quadrature Phase Shift Keying) modulator used to transmit control data used by the descrambler in reconstructing the original video, audio and user data signals. The modulation frequency is 3.58 MHz, or the same frequency as the color subcarrier, and the modulated control data is inserted on the blanking level of the pre-equalizing and post-equalizing intervals (video lines 1–3 and 7–9).

B.F. BLANKING inserts a color reference burst on the equalizing intervals followed by data in the position specified by the DATA MODE signal. The CHANGE DATA signal commands the modulator to change phase for the next group of data which is stored in the data FIFO memory 150. The modulation has a relative phase offset by 45° with reference to the color burst for ease of demodulation in the descrambler. The data FIFO memory 150 is loaded with data from the data controller 86 (FIG. 13), via an 8-bit data bus and handshake signals CNTRL FIFO RESET, CNTRL FIFO SI, and CNTRL FIFO INPUT READY.

- BF ACTIVE, (Burst Flag Active) a signal occurring during lines 10–262 directly after the H sync pulse; this signal is an indication of where to insert color burst;
- BF BLANKING, (Burst Flag Blanking) a signal occurring during vertical sync and occurring at lines 1—3 and 7-9 immediately after the equalizing pulses, also indicating insertion of color burst which is used by the descrambler for data demodulation;
- COMP SYNC, (Composite Sync) derived from the timing decoder (FIG. 9) and representing all the sync pulses stripped of video; this signal indicates to the sync/subcarrier generator where to regenerate sync;
- DATA MODE, a signal also derived from the timing decoder and defining the intervals available for insertion of control data;
- CHANGE DATA, a timing signal from the timing decoder signalling a change of quadrature information required;
- H18 to H262, a signal from the timing decoder signifying the period of audio transmission;
- Q0+2T and Q1+2T, which are the quadrature signals previously noted, further delayed by a phase quadrant, and used to define the four phase quadrants of color burst and QPSK data modulation.

The sync/subcarrier generator 107 is further controlled by data from a FIFO memory 150 which receives information relating to the encrypted control data.

The digitized output from the multiplexer 106 thus contains all the information of the original video together with control information by which it can be decrypted at a descrambler to which the control information is addressed. The digitized output is passed through a variable delay 109, consisting of a variable length shift register and latch, the purpose of which is to delay the video data with respect to the audio subcarrier by an amount which will ensure synchronism between the audio and video signals. The composite output from the summing amplifier 103 can be transmitted in the same way as any standard television signal and will be received by any standard receiving equipment. However, the audio and video contents will be unintelligible and can only be made intelligible when decrypted in accordance with the decryption data transmitted along with the signal.

Figure 12:
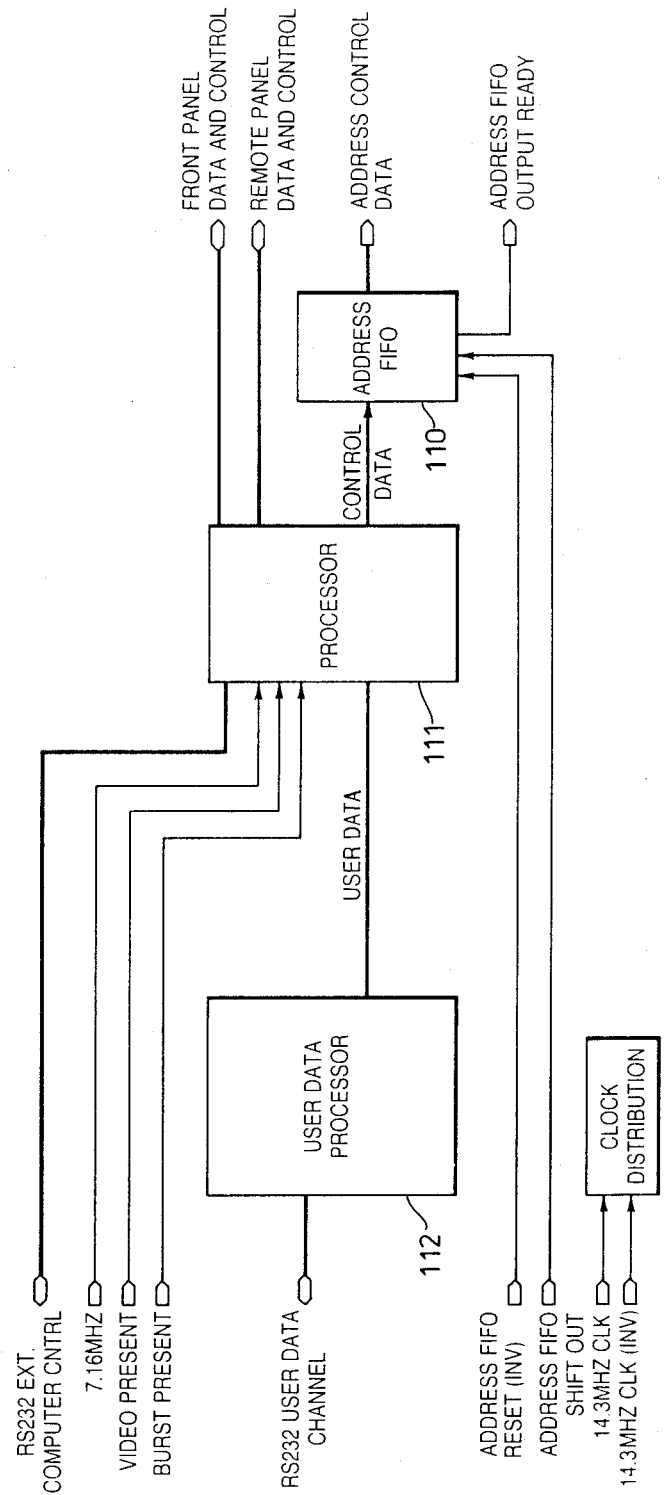
FIG. 12 is a block diagram of the Interface Controller of FIG. 6.

The interface controller 58 of FIG. 6 is shown in block diagram form in FIG. 12. Its purpose is to interface the memory controller (FIG. 3) with external sources of information relating to the addressing of receiving equipment for whom the television signal is intended and serves also as an input buffer for the user data channel In this connection, although each receiving equipment of the network will have its own descrambling unit which, when enabled, can be used to descramble the received signal, it is necessary to enable the descrambling units selectively so as to exclude those which for one reason or another are not intended to receive the transmitted information. The scrambler has a front control panel providing an array of thirty-two switches which can be operated manually so as to enable circuits which generate the requisite number of address codes. In addition, the scrambler is connected either directly or by a telephone line to an external computer control which similarly generates appropriate address codes in accordance with address-related information received locally or at a remote location. Referring to FIG. 12, the address control data is entered into a FIFO memory 110, the output of which is entered into the data controller 86 (FIG. 13) of the memory controller under the control of an ADDRESS FIFO OUTPUT READY signal from the memory. This address control data is received by the FIFO memory from a front panel/external computer interface processor 111, which processes all the address information required by the memory controller. The front panel/external computer interface processor 111 interfaces with the front control panel and also with a similar remote control panel from which the descramblers can be selectively addressed. A VIDEO PRESENT signal and a BURST PRESENT signal from the input processor are received with a 7.16 MHz (half clock frequency) clock signal and processed to provide indications at the front and remote control panels of the presence of video and burst. The processor 111 interfaces with an external computer to receive addressing information from an external source.

Thus, the front panel/computer interface processor has three functions:

(1) to receive status and user data,
(2) to update front panel LED and system bypass relays, and
(3) to receive user addressing information.

The processor is interrupted with V input. This starts a task which is repeated every vertical interval. During this interrupt, the user data bytes are collected from the user data buffer 112, as well as system status, burst present, video present and bypass data. The above status is echoed to the front panel and display with LEDs. This data is sent to the FIFO of the data controller 86 (FIG. 13).

The processor has three ways of obtaining information for user addressing.

(1) The thirty two switches on the inside front panel of the scrambler address the first thirty two descramblers within the scrambling link. When switch #1 is ON, descrambler #1 is enabled (and the reverse).
(2) The second way obtains user addressing from the RS232 port. A terminal is connected to the port and a program in the processor allows a person to input or modify addressing information stored within the processor.

(3) The third method has a computer connected to the RS232 port, and the computer downloads information to the processor.

The above addressing data is compiled and configured to achieve an addressing rate of approximately 14,400 per second. During the vertical interrupt, this data is appended to the status and sent to the data controller 86 via the FIFO 88.

A user data processor 112 serves as a buffer user data channel and interface processor 111. A user data processor 112 accepts RS232 data from an external port (user data channel). This processor acts as a FIFO, buffering the incoming data to an output rate of two data bits per field. RS232 handshake lines are provided in order to indicate to the user a buffer full condition. A V interrupt signal allows the buffer to be emptied of two bytes of data and a byte count. This byte count tells the Front Panel/Computer Interface 111 how many user data bytes are being transmitted. This user data is encrypted and transmitted to the descrambler, which in turn decrypts it and outputs it by use of a RS232 port. One of the uses of this user data is to allow billing information, schedule changes etc. to be displayed at the descrambler site. This is achieved by connecting the port to an ASCII display. The FIFO memory 110 is controlled by ADDRESS FIFO RESET and ADDRESS FIFO SHIFT OUT signals from the data controller 86 of the memory controller (FIG. 13).

Descrambler Overview

The scrambled analog video signal, including the audio data and user data, is received by the descrambler at a receiving station and converted to a digital format. The control information, including decryption data transmitted with the video signal is separated and decoded. The decoded data enables a digital controller to allow a video processor to reconstruct the video signal to its original format.

All the digital control information received by the descrambler is eliminated at its output. The video signal, with new sync and burst inserted, conforms to the EIA Standard 170A and maintains zero SCH at all times. The block-coded audio data is extracted from the video signal and decoded. Audio is restored to an analog waveform via D/A converters. Since the audio and video signals share the same processing paths there is no audio to video delay in the system.

Descrambler Organization

Figure 15:
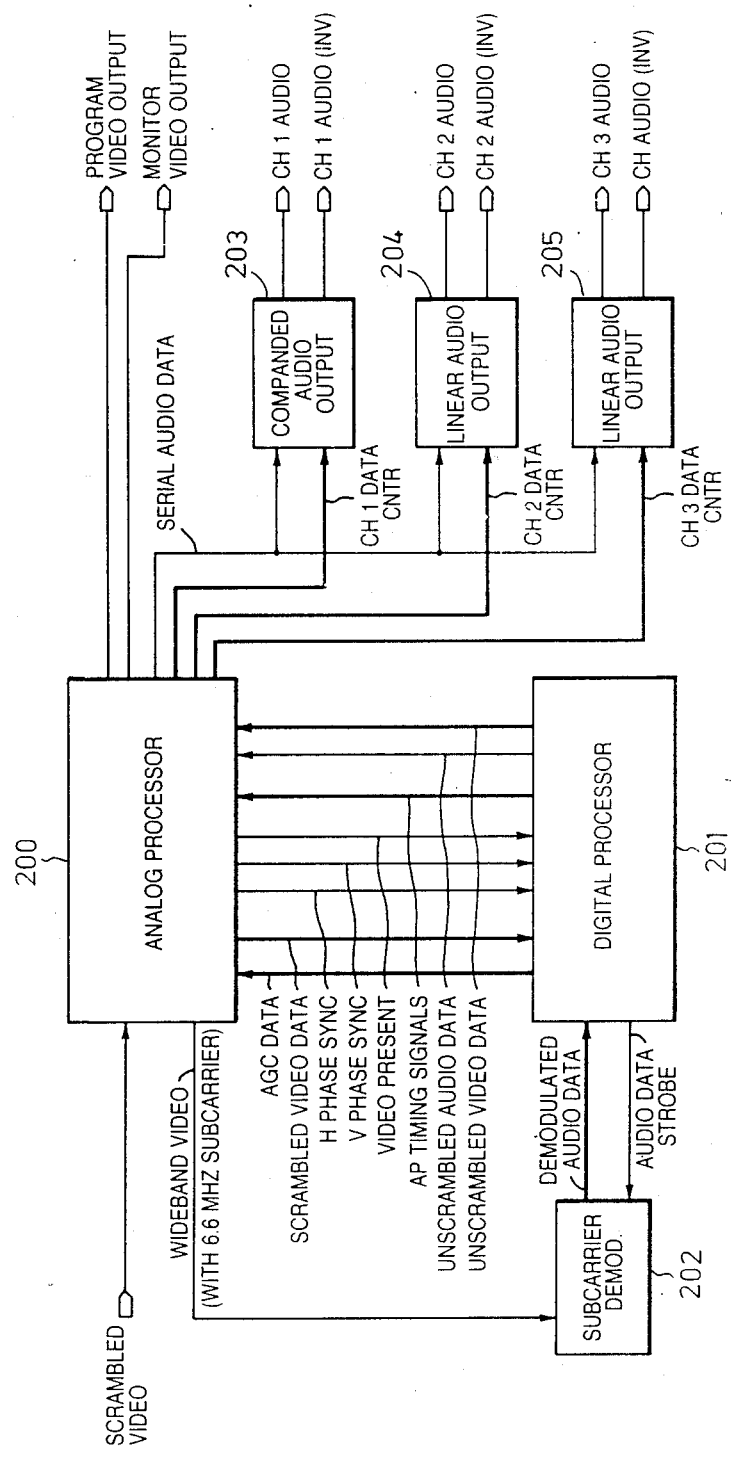
FIG. 15 is a block diagram showing the actual organization of the descrambler.

Referring to FIG. 15, the descrambler is organized as a number of interconnected circuit boards designated Analog Processor 200, Digital Processor 201, Subcarrier Demodulator 202, Companded Audio Output 203, and Linear Audio Outputs 204 and 205.

The analog processor 200 receives the incoming scrambled video signal, from which the various control signals are stripped for use by the digital processor 201, and from which a wideband video signal with audio subcarrier is derived. The latter signal is fed to the subcarrier demodulator 202, and the demodulated audio is passed to the digital processor for further processing.

The control signals used by the digital processor 201 for reconstructing the original format of the scrambled video include AGC data, H phase sync, V phase sync and various timing signals. The scrambled video data is also passed to the digital processor where it is descrambled together with the demodulated audio data. The descrambled video and audio data are returned to the analog processor 200 which separates out the standard video besides passing the audio data of the three channels to output stages 203, 204 and 205 at which original audio is derived.

Figure 16:
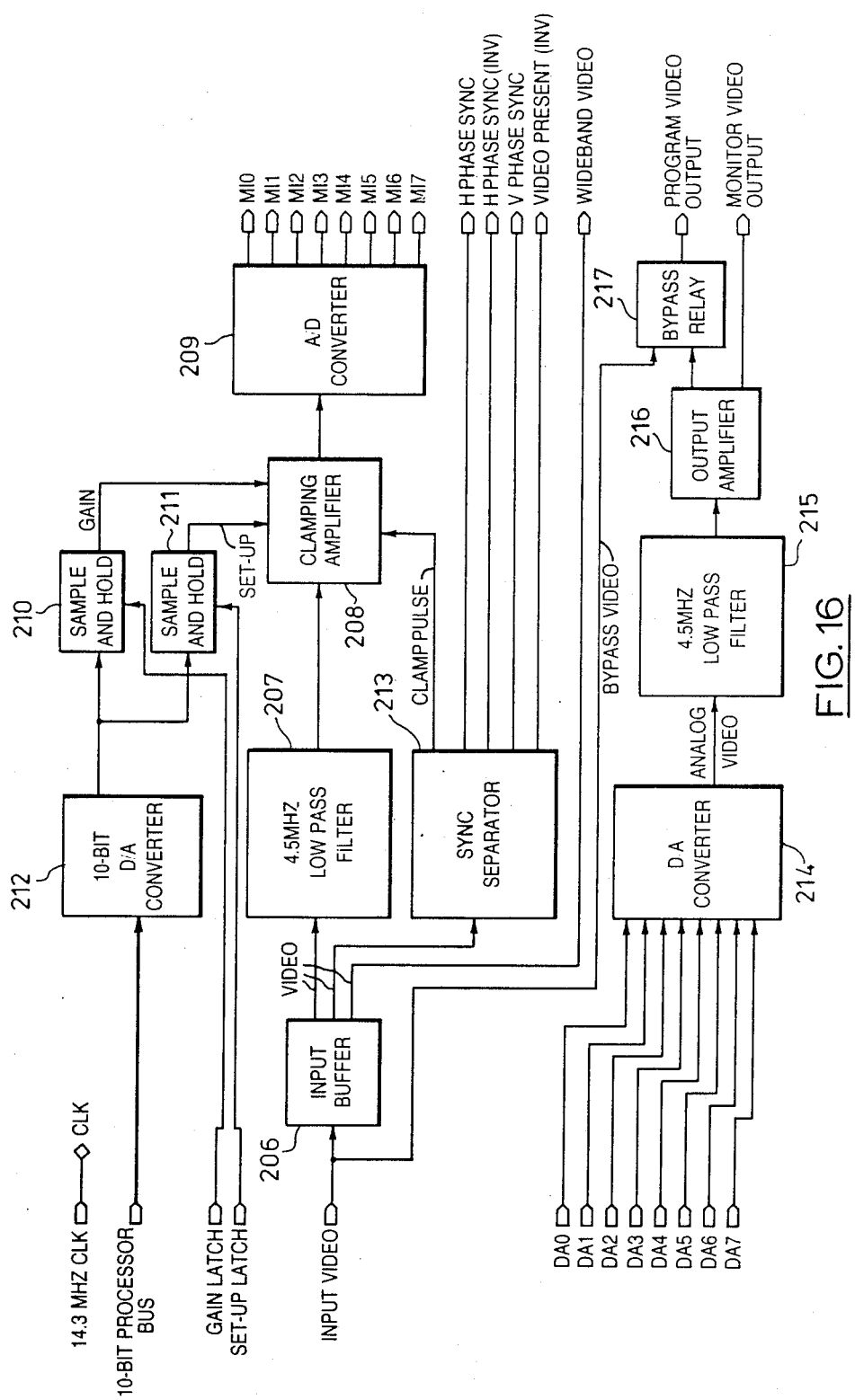
FIG. 16 is a block diagram of one board of the Analog Processor of FIG. 15.

The analog processor itself comprises three sections, namely a first section for receiving and processing the incoming video signal, a second section for receiving and converting the descrambled video data from the digital processor, and an audio processing section. FIG. 16 is a block diagram of the first and second sections of the analog processor. The incoming video signal is applied to an input buffer 206 having three outputs. The first output is passed through a 4.5 MHz low pass filter 207 to a clamping amplifier 208 which provides d.c. restoration. The signal is sampled and digitized by an A/D converter 209, the resultant digital output being 8-bit video data MI0 to MI7. The sampling for the analog-digital conversion is effected by a pair of sample and hold circuits 210, 211. The sample and hold circuits receive automatic gain control data AG0 to AG9 from the security processor of the digital processor (FIG. 18), the data being converted to an analog format by a D/A processor 212. The sample and hold circuits are controlled by GAIN STROBE and SET-UP STROBE signals also from the security processor. The second output of the input buffer amplifier 206 is passed to a sync separator 213, from which are derived a clamp pulse for the clamping amplifier 208, and control signals inherent in the video, namely H PHASE SYNC, V PHASE SYNC, and VIDEO PRESENT. The sync separator is identical with the sync separator shown in FIG. 8a.

The third output of the input buffer amplifier 206 is simply the WIDEBAND VIDEO signal, which is passed to the subcarrier demodulator and processed as described with reference to FIG. 24.

The second section of the analog processor comprises a D/A converter 214, which converts the descrambled video data DA0 to DA7 to analog format. The analog video is passed through a 4.5 MHz low pass filter 215 to an output amplifier 216. One output of the amplifier is used for monitoring, while the other output is taken to a bypass relay 217. The bypass relay 217 is deactivated if the incoming video signal is not scrambled or if the descrambler has failed, thereby bypassing the descrambler and taking the program video output direct from the video input. This allows the use of a hot standby descrambler to be active by connecting two or more descramblers in series. This is achieved by connecting the outputs of the first descrambler (Audio, Video and user Data) into a second descrambler. When the first descrambler is working properly, the second receives descrambled video and bypasses the Audio, Video and Data paths since there is no control information. When the first descrambler fails it bypasses the scrambled video, which is received by the second scrambler which now becomes active.

Figure 17:
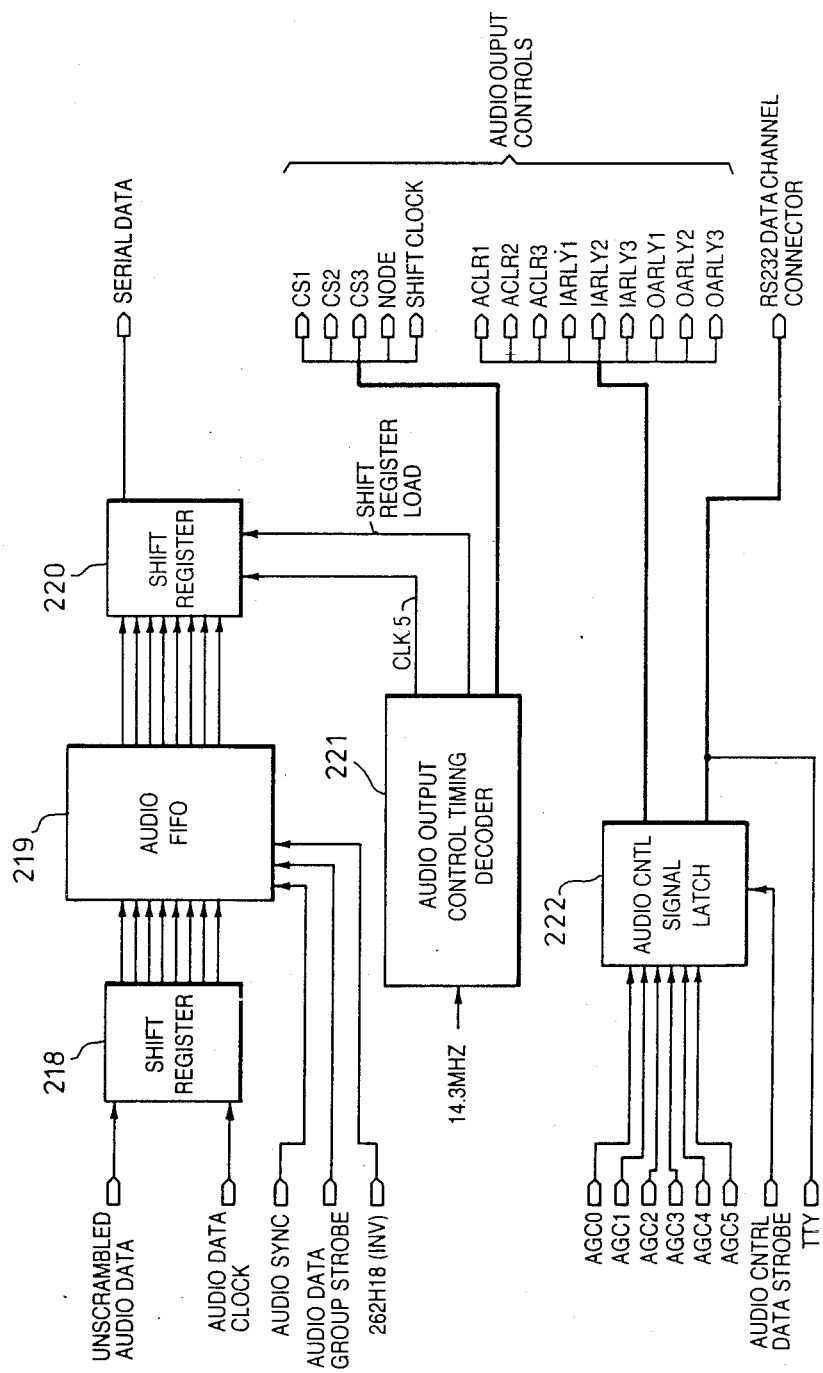
FIG. 17 is a block diagram of a second board of the Analog Processor of FIG. 15.
Figure 19:
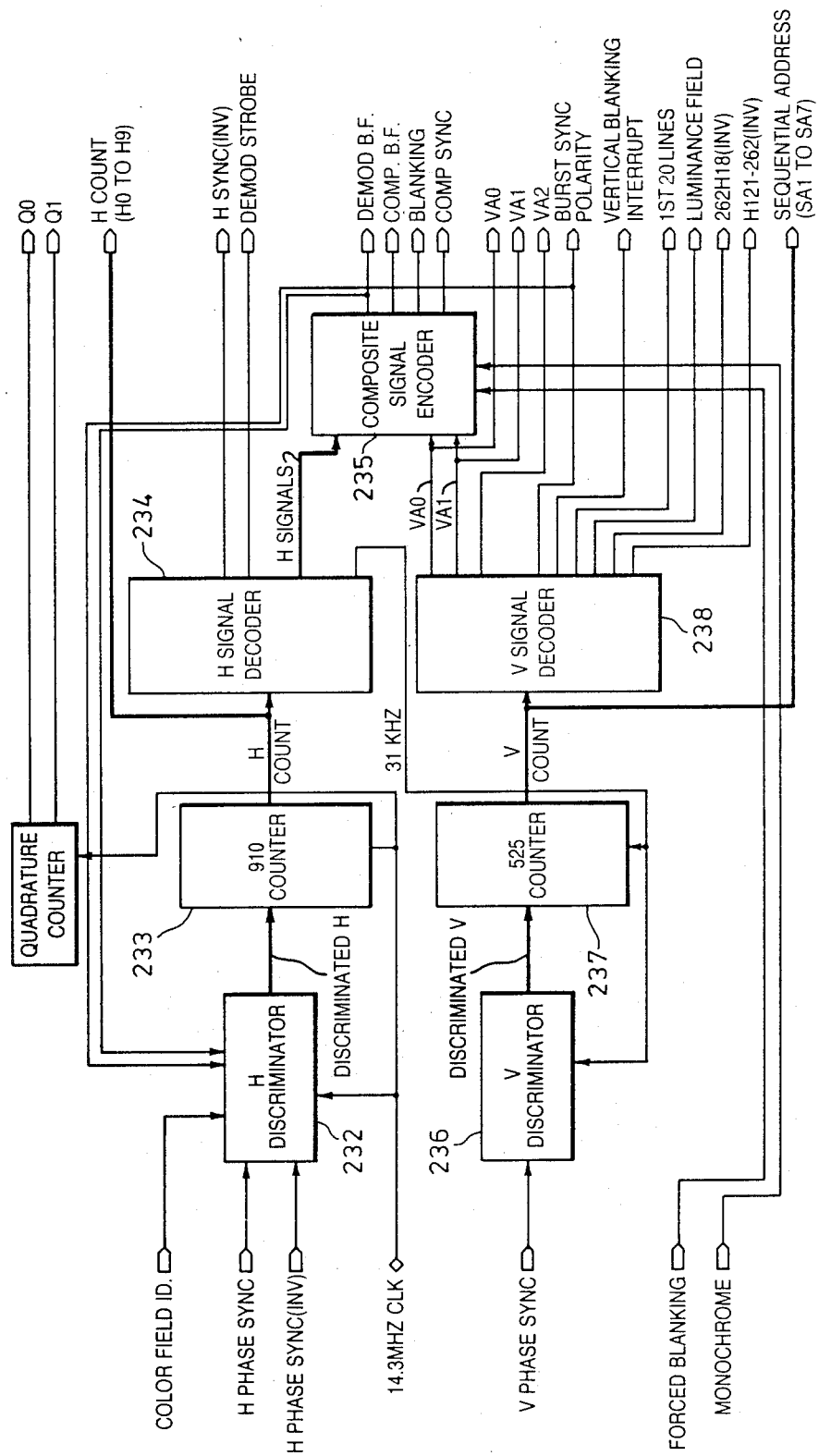
FIG. 19 is a block diagram of the Timing Decoder constituting part of the Digital Processor of FIG. 18.
Figure 20:
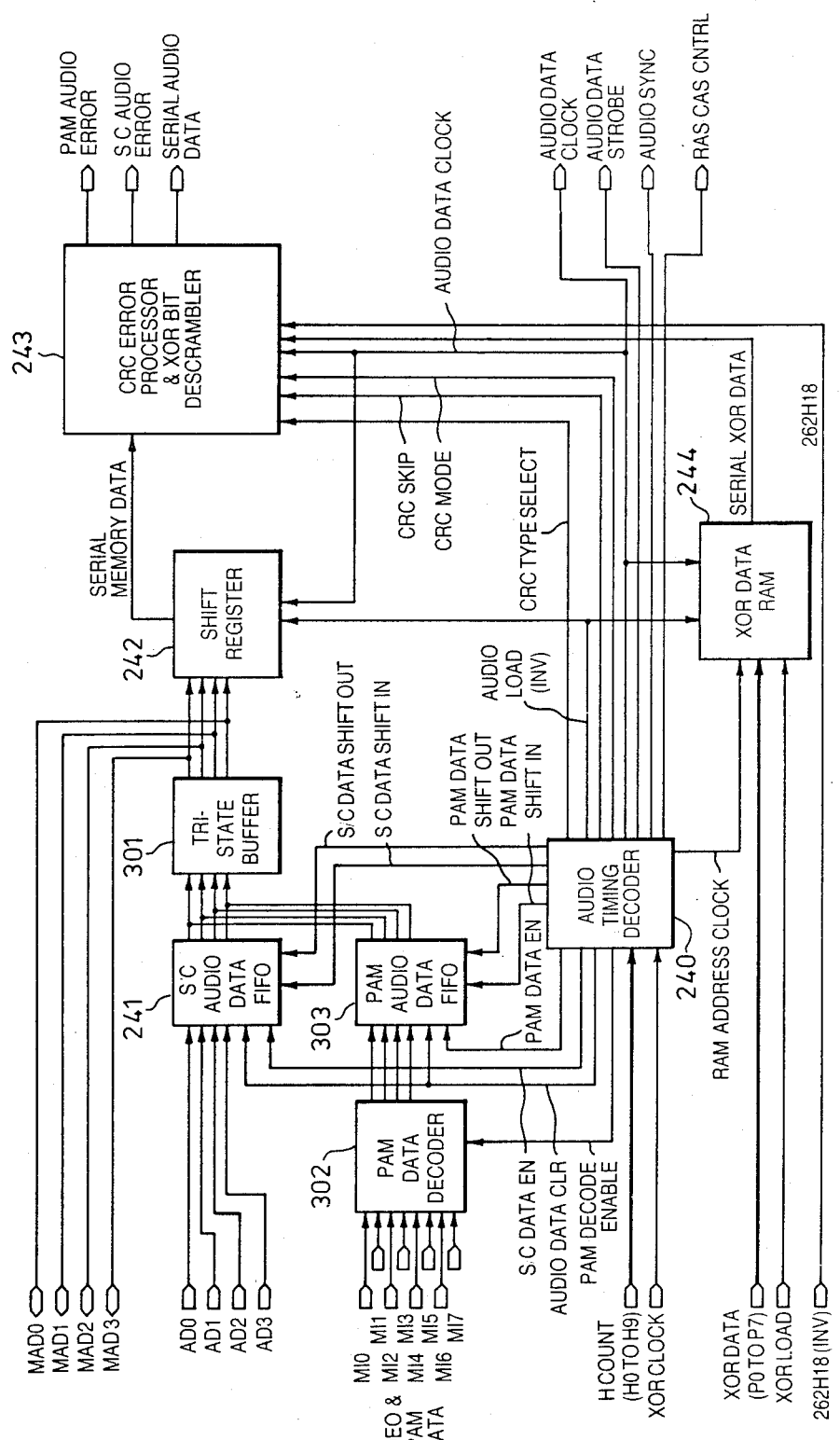
FIG. 20 is a block diagram of the Audio Processor constituting part of the Digital Processor of FIG. 18.

FIG. 17 is a block diagram of the audio processing, or third, section of the analog processor. This comprises a shift register 218 controlled by an AUDIO DATA CLOCK signal from the audio timing decoder (FIG. 20), which receives the descrambled audio data from the audio processor section of the digital processor (FIG. 20). The contents of the shift register 218 are entered into a FIFO memory 219 under the control of control signals AUDIO SYNC and AUDIO DATA GROUP STROBE from the audio timing decoder (FIG. 20) and 262H18 from the V signal decoder of the timing decoder section of the digital processor (FIG. 19). The contents of the FIFO memory are entered into another shift register 220, under the control of SHIFT REGISTER LOAD signal from a control timing decoder 221, and are clocked out by a CLOCK/5 signal. The resultant serial data is passed to the audio output stages along with various audio output control signals from the control timing decoder 221.

Figure 18:
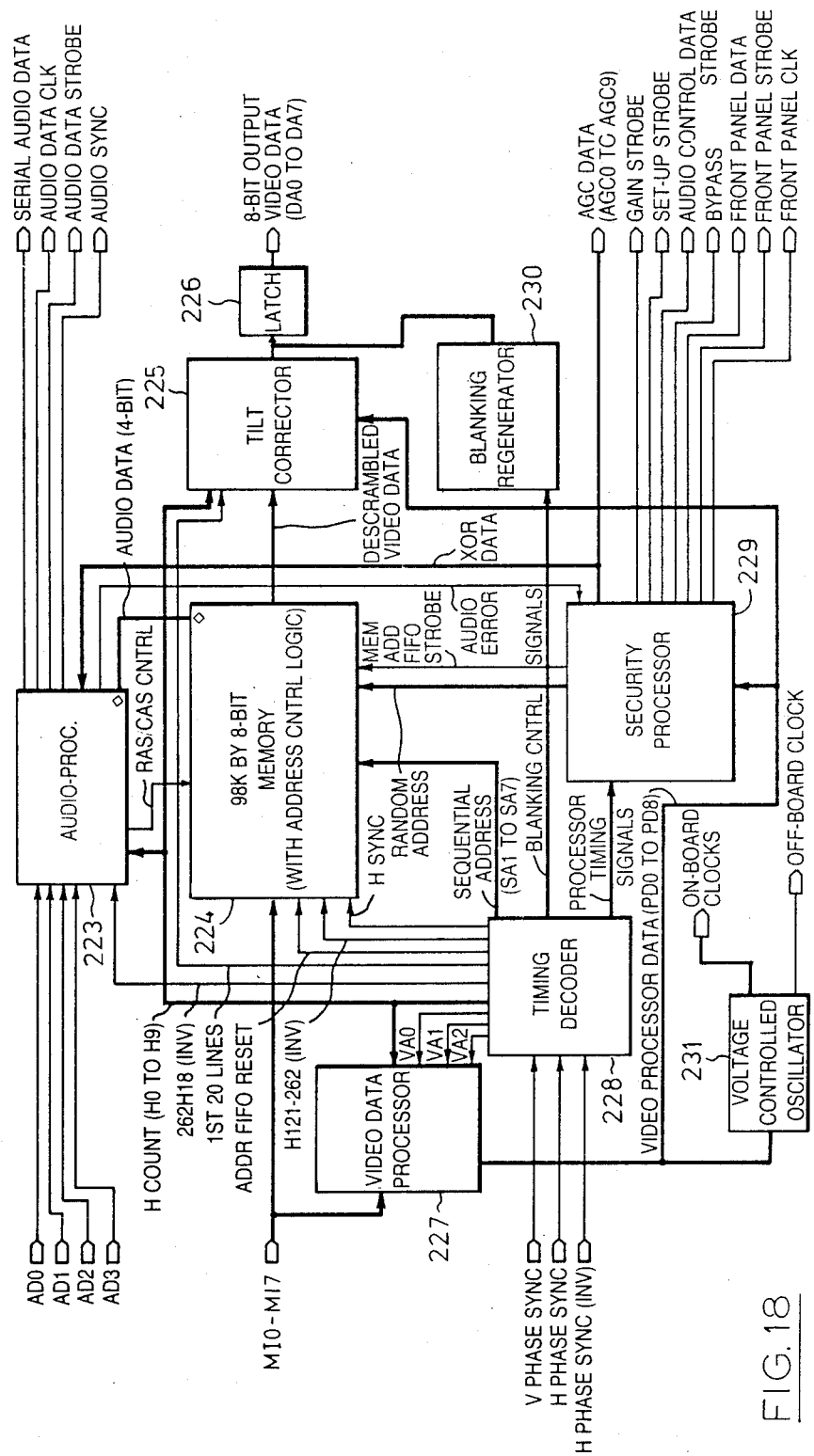
FIG. 18 is a block diagram showing the organization of the Digital Processor of FIG. 15.

The audio output control signals include data AGC0 to AGC5, from the security processor of FIG. 18, which are latched into an audio control signal latch 222 and clocked out by an AUDIO CONTROL DATA STROBE signal also from the security processor. The output of the latch 222 also goes to an RS232 channel connector.

Figure 22:
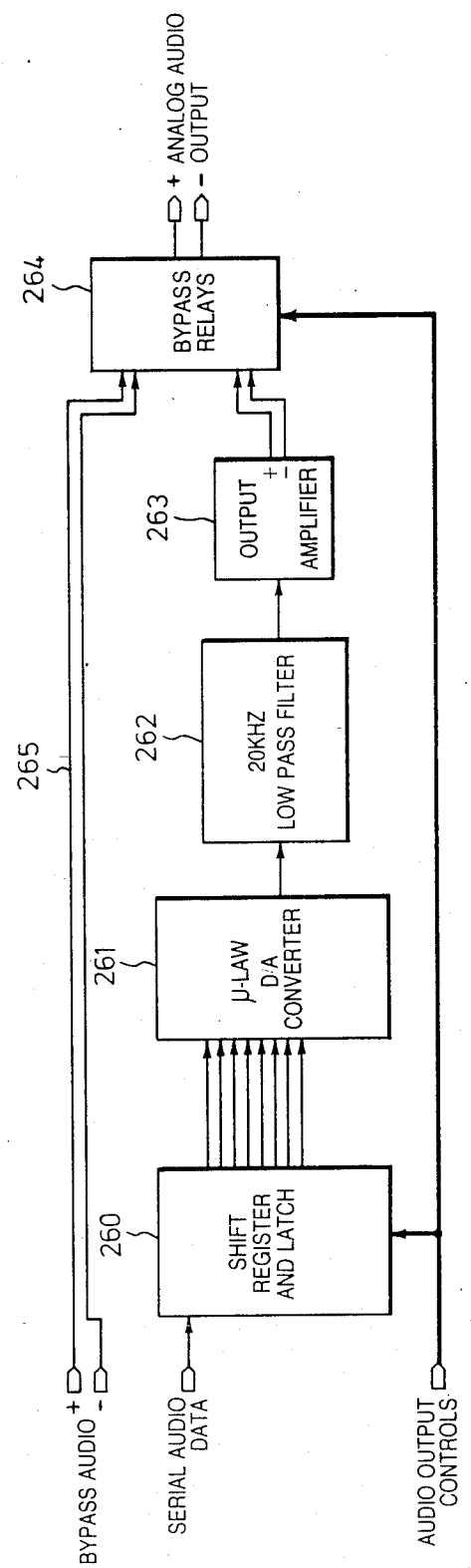
FIG. 22 is a block diagram of the Companded Audio Output of FIG. 15.
Figure 23:
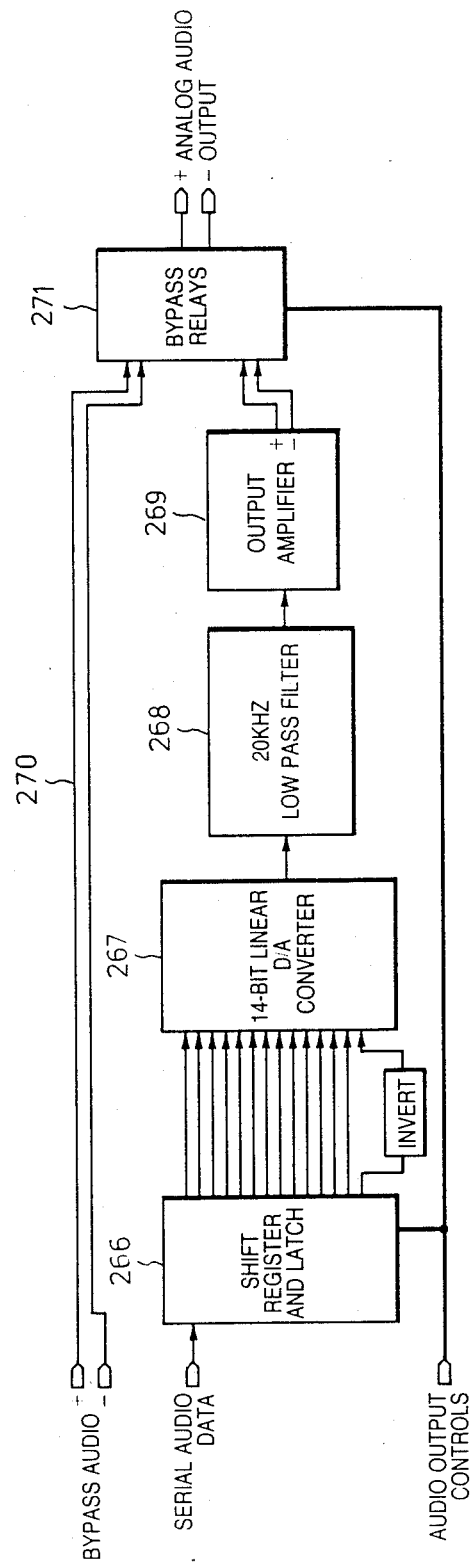
FIG. 23 is a block diagram of one of the Linear Audio Outputs of FIG. 15, the other Linear Audio Output being essentially the same.

The eight AUDIO OUTPUT CONTROLS control the transfer of data to the three audio output boards (FIGS. 22 and 23). The audio data for the three channels is time-division multiplexed on the SERIAL DATA line which runs from shift register 220 to all three boards. The three chip select signals CS1, CS2 and CS3 are used to enable the shifting of data into each of the three output boards when their respective data is present on the SERIAL DATA line.

The MODE signal controls the latching in of 8 or 14-bit words into the output boards after the data has been shifted into the boards serially. The SHIFT CLOCK is the same CLK/5 rate used to clock data from the analog processor board and then into the shift registers on the audio output boards. ACLR1 (Audio Clear), ACLR2 and ACLR3 are signals which clear the data from each of the three audio output boards. These signals are used to "mute" the audio under control of the SECURITY PROCESSOR. AGC0 to AGC5 are six bits from the main bus of the SECURITY PROCESSOR from which the three ACLRs are latched. The remaining controls are the IARLY and OARLY signals which each control an input or an output relay on each of the three output boards, thus putting the bypass function under control of the SECURITY PROCESSOR.

The digital processor 201 is at the heart of the descrambler. It receives from the analog processor 200 all the video and audio data in scrambled form, together with the decryption data and relevant control data, and after descrambling returns the data to the analog processor for further processing. FIG. 18 is a general block diagram showing the organization of the digital processor.

The components of the digital processor, as shown in FIG. 18, comprise an audio processor 223, a 98K×8-bit memory with address control logic 224, a tilt corrector 225, an output latch 226, a video data processor 227, a timing decoder 228, a security processor 229, a blanking regenerator 230, and a voltage controlled oscillator 231 for producing clock signals used in the system. The audio processor 223 will be described with reference to FIG. 20. Basically the audio processor receives four bit audio output data AD0 to AD3 from the subcarrier demodulator (FIG. 24) and video data MI0–MI7 from the video data processor 227, and produces serial output data along with various audio control signals, which are sent to the three audio output boards 203, 204 and 205 (FIG. 15) at which the output data is converted to analog format in each of the three channels.

The memory 224 is described with reference to FIG. 21. The memory receives all of the scrambled video data and scrambled audio data, together with decryption data and address control signals, and outputs the descrambled video and audio data for further processing.

The video data processor 227 is analogous to the burst error processor 73 (FIG. 8) of the scrambler. It has three main functions, one function being to examine the 8-bit video data MI0 to MI7 received from the A/D converter 209 of the analog processor (FIG. 16) and to look for color burst. In accordance with this the processor 227 controls the voltage controlled oscillator 231 so as to lock the 14.3 MHz clocks to the color burst. The processor 227 also extracts from the incoming data the white marker and the blanking level used by the tilt corrector 225 and security processor 229 for AGC and automatic Set-up control. Thirdly, the processor 227 extracts during the pre-equalizing and post-equalizing periods of the incoming data QPSK control data PD0 to PD8 for controlling the security processor 229.

The security processor operates on the data PD0–PD8 from the video data processor 227. It extracts the data representing the White Marker and Set-up, digitally filters it and outputs the AGC and Set-up correction to the analog processor 200. Secondly, the portion representing the control data is decrypted by the DES analogously to the data controller 86 (FIG. 13). If the descrambler possesses the correct KEY the decryption process is successful and thus appropriate control and addressing information can be generated to descramble the video, audio and user data channel information.

The user data channel information is also processed and output by the security processor.

The timing decoder 228 is essentially similar to the timing decoder 53 (FIG. 6) of the scrambler. Although the timing decoder will be described with reference to FIG. 19 it may be mentioned at this point that its purpose is to decode the H PHASE SYNC and V PHASE SYNC signals extracted from the input video by the sync separator 213 (FIG. 16). From these signals the various timing signals of the digital processor are derived.

The security processor 229 receives the video processor data PD0 to PD8 and, under the control of processor timing signals from the timing decoder 228, controls the read out from the memory 224 in such a way that the lines of information in scrambled order are read out in their original sequence. The security processor also derives various control signals as follows:

XOR DATA, for control decryption of the control data (FIG. 20),
AGC DATA (AGC0 to AGC9), which is applied to the latch 222 (FIG. 17) and to the D/A converter 212 (FIG. 16) of the analog processor,
GAIN STROBE and SET-UP STROBE (or GAIN LATCH and SET-UP LATCH) which control the sample and hold circuits 210 and 211 of FIG. 16,
AUDIO CONTROL DATA STROBE, which is a strobe signal for the FIFO memory 219 of FIG. 17,
BYPASS, for controlling the bypass relays,
FRONT PANEL DATA, STROBE and CLOCK SIGNAL used simply for indicating purposes at the front panel (not shown).

The tilt corrector 225 receives and corrects the level of descrambled video data from the memory 224 and passes the corrected data to the output latch 226, which also receives the requisite blanking signals from the blanking regenerator 230. The latch outputs 8-bit video data DA0 to DA7 to the D/A converter 214 of the analog processor (FIG. 16).

The tilt corrector 225 (FIG. 18a) has two functions, namely:

(i) a digital clamp, which corrects for analog clamp errors by adding or subtracting a constant to or from each video line;
(ii) a device for tilt correction, which corrects for line rate tilt by adding or subtracting linear ramp data to or from each video line.

The tilt corrector must delay the video line to be inserted, by at least one H(63.5 MS). This allows time to sample both the front and back porches of the incoming line and derive correction data. This data is then added or subtracted to or from the delayed video. By using multiple line delays, and sampling several front and back porches, and curve filling, higher order correction data is derived. Since the read-modify-write memory always provides at least one line of delay, extra delay circuitry is not needed in this application. Additional memory is needed to store and descramble the front and back porch sampled data since the delay through the video memory is not constant.

The Digital Clamp

The sampled back porch area is processed by the burst processor. This data PD0 to PD7 is latched by latch 2251 and is stored in the memory 2253 with respect to the line address MA0–MA7. This data is stored to match the video delay of the video memory. Then the data is read from the memory 2253 and into the EPROM 2252. The output of the EPROM 2252 is loaded into an up/down counter 2254 via the tilt controller. This output is the sampled data minus the desired back porch value, which is stored in the EPROM as a look-up table and is added or subtracted to or from the descrambled video data MO0–MO7 via an adder 2257 and output to the analog processor (FIG. 16) as DA0–DA7.

The Tilt Corrector

The sampled front porch area is subtracted from the back porch data by the burst processor. As above, data PD0–PD7 is stored and delayed in the memory 2253. This data is input into the EPROM 2252 which has the ramp slope coefficient stored in it as a look-up table. This coefficient represents the above differences of the porches divided by the number of samples between porches, which in turn is loaded into a counter 2255.

This counter 2255 increments or decrements the up/down counter 2254, creating a ramp. The path follows as above by adding or subtracting this to or from MO0–MO7.

The timing decoder section of the digital processor is illustrated in FIG. 19. The timing decoder comprises essentially an H signal processing section, a V signal processing section, and a composite signal encoder. The H signal processing section comprises an H discriminator 232 which receives the H PHASE SYNC signals from the sync separator 213 (FIG. 16) of the analog processor and checks for valid H PHASE SYNC. The H discriminator 232 also receives a signal COLOR FIELD I.D. from the security processor indicating the particular color field which is current.

The discriminated H signal is fed to a 910 counter 233, where 910 as previously stated represents the number of video samples taken per line of video, and the output of the counter 233 is decoded by an H signal decoder 234 to produce timing signals H SYNC and DEMOD STROBE which are used by the memory 224. H signals from the decoder 234 are also applied to the composite signal encoder 235 as described below.

The V signal processing section comprises a V discriminator 236 which receives the V PHASE SYNC signal from the sync separator 213 (FIG. 16) and checks for valid V PHASE SYNC. The discriminated V signal is fed to a 525 counter 237, where 525 as previously stated represents the number of half lines in one frame of video, (2×232½), and the output of the counter 237 is decoded by a V signal decoder 238 to produce the following timing signals:

VA0, VA1 and VA2, which are column address signals applied to the video data processor 227 of FIG. 18,
BURST SYNC POLARITY which is applied to the H discriminator 232 of FIG. 19 and to the memory section 224,
VERTICAL BLANKING INTERRUPT for controlling the blanking regenerator 230,
FIRST 20 LINES, applied to the memory control decoder of the memory section 224 (FIG. 21),
LUMINANCE FIELD, applied to the memory 224,
262H18, applied to the audio processor 223 (FIG. 18),
H121 to H262, used in control of the memory 224.

The H signals of the H signal decoder 234 are multiplexed with signals VA0 and VA1 by the composite signal encoder 235 to produce the following composite signals which are used to control the blanking regenerator 230 (FIG. 18): DEMOD BURST FLAG, COMPOSITE BURST FLAG, BLANKING AND COMP. SYNC.

The composite signal encoder is controlled by signal MONOCHROME from the security processor 229, which signal indicates monochrome reception and gates the burst flag. The signal FORCED BLANKING is received from the security processor in the event that the descrambler is not enabled. If the descrambler is not enabled, this signal forces the output to blanking so that the user will receive no active video.

To sum up, the composite signal encoder 235 combines H and V signals from the decoders 234 and 238. The decoder 234 produces H related timing signals which are: H sync, burst flag, equalizations, serrations and H blanking. The decoder 238 produces the V related signals of VA0 and VA1 which indicate the position vertically of the H signals. A multiplexer combines the H signals with respect to the V signals from the decoder 238. These composite signals control color burst (Comp BF), Blanking and Sync (Comp Sync). Extra signals from the security module force burst flag off for monochrome signals and force blanking for descramblers which are disabled. The DEMOD B.F. signal is always on during lines 10 to 262 and is used on the subcarrier demodulator.

A quadrature counter 239, controlled by the 14.3 MHz clock, furnishes two further timing signals Q0 and Q1 at half the clock frequency, the signals being in phase quadrature.

Figure 21:
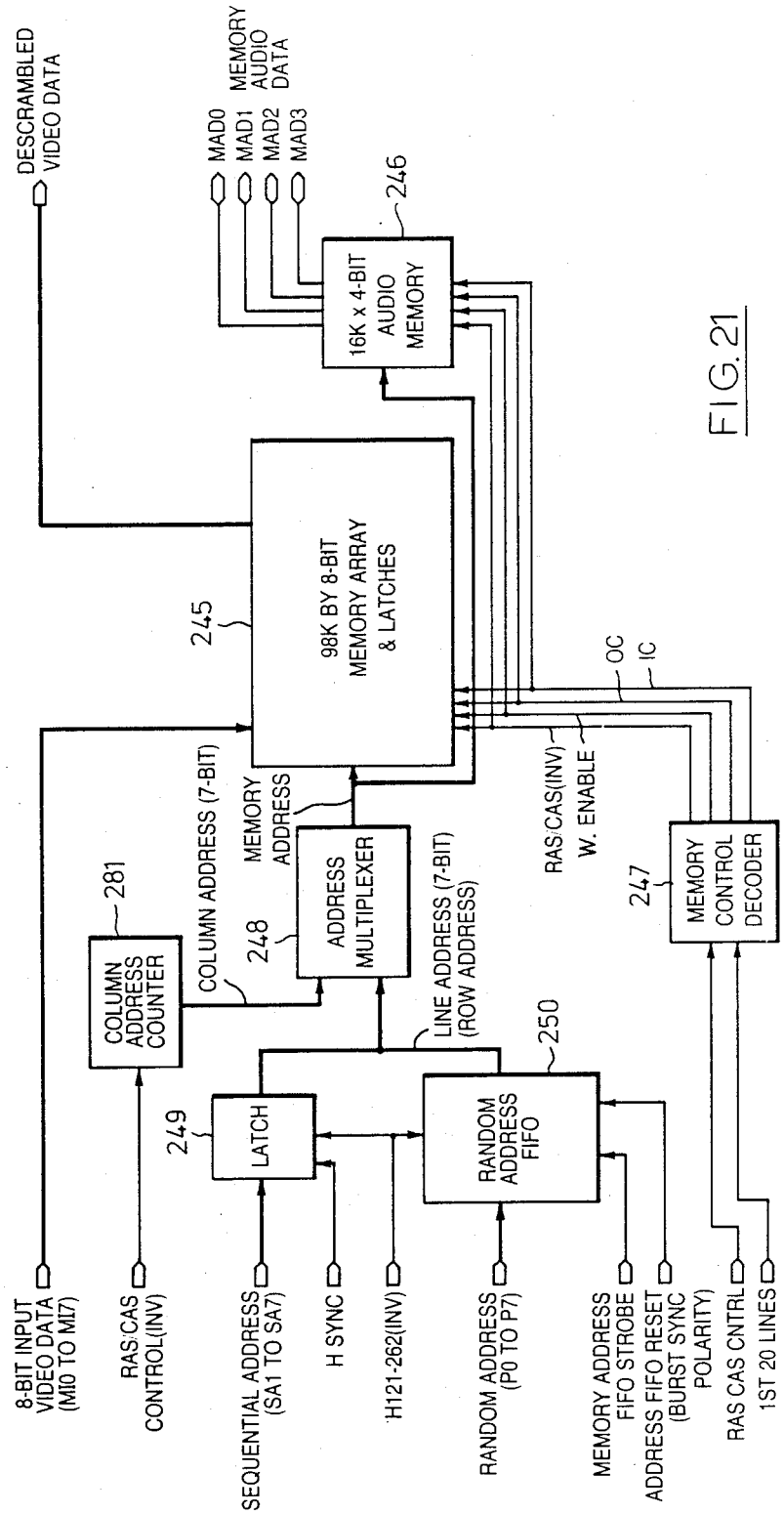
FIG. 21 is a block diagram of the Memory Array forming part of the Digital Processor of FIG. 18.
Figure 24:
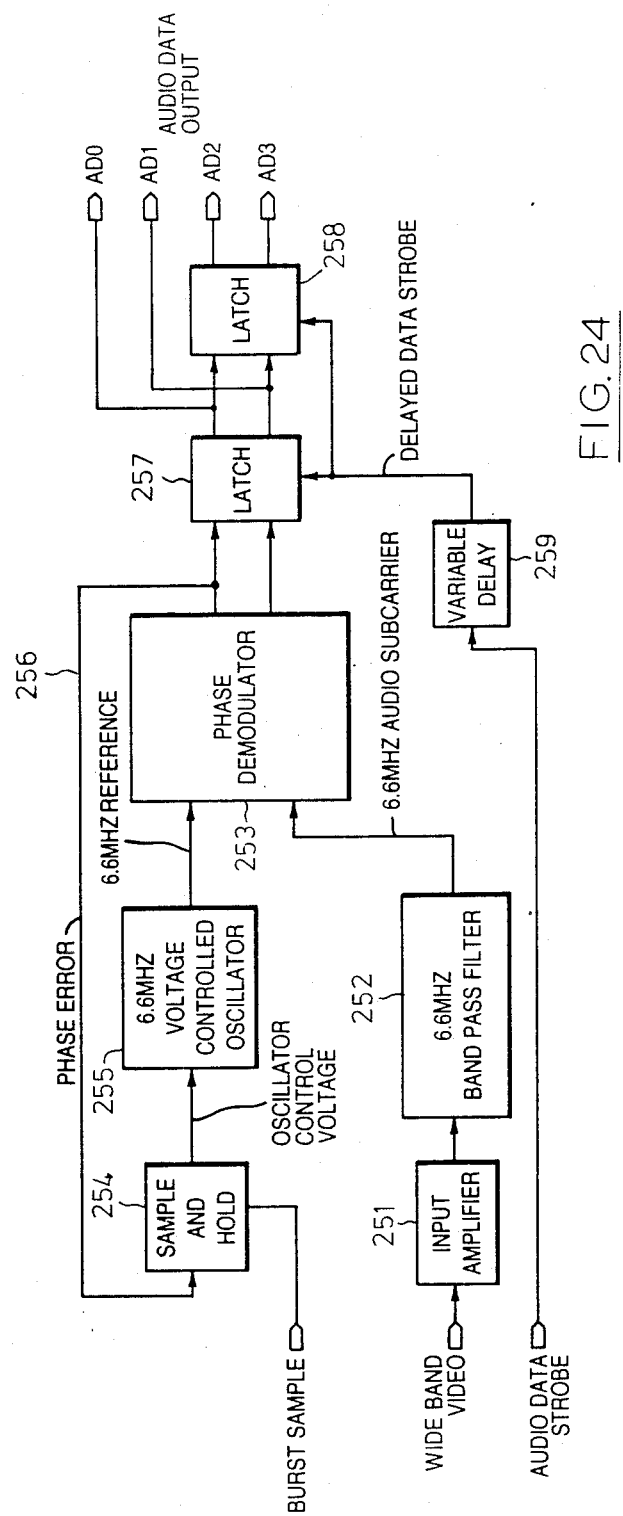
FIG. 24 is a block diagram of the Subcarrier Demodulator of FIG. 15.

Referring now to FIG. 20, the audio processor section of the digital processor includes an audio timing decoder 240 from which the audio timing signals are derived. The decoder 240 receives signals H0 to H9, and XOR CLOCK, from which it derives various timing signals for controlling the FIFO memories 241 and 303 and the CRC error processor 243, and also:

CRC SKIP and CRC MODE for controlling a CRC error processor 243,
AUDIO DATA CLOCK for clocking the shift register 242 and the CRC error processor 243, AUDIO DATA STROBE used by the subcarrier demodulator of FIG. 24, AUDIO SYNC which controls the FIFO memory 219 of FIG. 17, and RAS/CAS CONTROL which controls the memory control decoder of FIG. 21.

Other timing signals noted in FIG. 20 include the 262H18 signal which is taken to the CRC error processor 243, and XOR LOAD, from the security processor 229 (FIG. 18) whereby XOR data (P0 to P7) is loaded into a shift register 244.

The audio data AD0 to AD3 from the subcarrier demodulator is entered into a 4-bit FIFO memory 241 and latched into a shift register 242 via a tri-state buffer 301. The PAM data is decoded by a decoder 302 from MI0–MI7 and entered into a FIFO memory 303. From the shift register 242 the data is fed serially to the CRC error processor 243. The input of the shift register is also connected to the 16K×4-bit audio memory of the memory section (FIG. 21), from which it receives memory audio data MAD0 to MAD3. The FIFOs 241 and 303 allow time domain multiplexing of subcarrier and PAM data.

It will be recalled that, in the scrambler, the CRC redundancy encoder 92 of FIG. 11 effected a preliminary scrambling of the audio data in accordance with BIT SCRAMBLE DATA. The purpose of the CRC error processor 243 is to effect descrambling of the XOR bit from the XOR data RAM 244, which is loaded from the security processor 229 (FIG. 18), and to compare the signals MAD0 to MAD3 with signals AD0 to AD3 and PAM data bit by bit so as to note any error in the received audio. If an error is detected, the CRC redundancy encoder produces a high bit which prevents the audio processor from passing the data of that particular sample but to repeat the conditions of the previous sample instead. This error condition is fed to the security processor to allow muting of audio channels with many errors. The audio timing decoder 240 generates the necessary control signals from the H count to shift data through the audio processor section. In this way objectionable noise from spurious error is avoided.

The CRC error processor 243 is implemented in the same manner as the CRC Encoder (FIG. 11a), with the exception of the reverse shift. After all the data bits and check bits are shifted in, the processor is put in check mode. The output of the EPROM of the CRC error processor indicates an error/no error condition. An additional output is passed to the security processor to allow muting of audio channels with several errors. The output is XORed to achieve the bit descramble.

Referring to FIG. 21, the memory section 244 (FIG. 18) comprises a 98K×8-bit video memory 245 which is similar to the memory 82 (FIG. 10) of the scrambler, except that the memory array is only one quarter of the size. This is achieved by replacing the 64K RAMs 823 (FIG. 10a) by 16K RAMs. The scrambled input video data MI0–MI7 is stored in the memory and reshuffled so as to reconstruct the original image. Reordering of the scrambled image is specified by the memory address and control signals RAS/CAS, W ENABLE, OC (Output Control) and IC (Input Control). The RAS/CAS signals are the Row Address and Column Address strobes. W ENABLE is a signal to enable writing into the memory 245, and OC and IC are the controls for the input and output latches in the memory. The output of the memory 245 is designated DESCRAMBLED VIDEO DATA which is 8-bits wide.

The address multiplexer 248 combines the row and column address signals to form a MEMORY ADDRESS bar as required by the memory array 245. Input to the multiplexer 248 originates from a column address counter 281 which is the address for the group of six pixels within a line and is incremented by RAS/CAS signal each time a memory cycle is performed. It will be recalled from the description of the scrambler memory 82 (FIG. 10) that six consecutive pixels are processed for each memory cycle.

The second input to the multiplexer 248 is composed of one of two signals, SEQUENTIAL ADDRESS SA1 to SA7, which is latched by latch 249, or RANDOM ADDRESS P0 to P7, which is stored in a random access FIFO memory 250. The memory 245 is loaded with a sequential address for the first one-half of a field and is then switched to a random address for the other half of the field, using the control signal H121-262. The RANDOM ADDRESS which in fact contains the descrambling information is derived by decrypting the control data which was sensed in the equalization interval by the security processor 229 (FIG. 18).

The audio memory 246 is controlled and addressed with the same information as the video memory array 245.

Control signals RAS/CAS (INV), W ENABLE, OC and IC for the memories are generated by a memory control decoder 247 in accordance with the signals RAS/CAS CNTRL and 1ST 20 LINES, which inhibits processing via memory for the first twenty video lines, i.e. vertical blanking. When the memory array is inhibited from processing, the input video data MI0 to MI7 is routed directly to the output.

The random access FIFO 250 is loaded with sequential address SA1 to SA7 once every field from the security processor 229 via a random address bus P0 to P7 and handshake signals MEMORY ADDRESS FIFO STROBE and ADDRESS FIFO RESET.

The descrambled video data DA0 to DA7 is passed to the "second section" of the analog processor (FIG. 16) where it is converted to analog form. Similarly, the audio memory 246 receives memory audio data from the audio processor (FIG. 20) and descrambles it according to the same descrambling pattern. The video and audio data are entered into the address locations of the memories sequentially, but are read out of the memories on a line by line basis in a random order which is the same as the order in which they were stored in the corresponding memories of the scrambler so that the readouts from the memories correspond to the original data format.

The decryption data for the memories 245 and 246 is contained in the MEMORY ADDRESS signal received by the memories from an address multiplexer 248. The address multiplexer receives 7-bit COLUMN ADDRESS data from a counter 281 derived from the RAS/CAS CONTROL signal, the latter being received from the audio timing decoder 240 of FIG. 20. The address multiplexer 248 also receives a 7-bit LINE ADDRESS signal which is derived from SEQUENTIAL ADDRESS SA1 to SA7 (V Count—see FIG. 19) via an 8-bit latch 249. The latch is controlled by timing signals H SYNC and H121 to H262. The multiplexer 248 also receives a ROW ADDRESS signal from a random access FIFO memory 250 into which the RANDOM ADDRESS signal P0 to P7 is entered. The memory 250 is controlled by the timing signal H121 to H262 from the V signal decoder 238 (FIG. 19), and signals MEM- ORY ADDRESS FIFO STROBE and ADDRESS FIFO RESET (or BURST SYNC POLARITY).

The audio data AD0 to AD3 which is inputted to the audio processor section of FIG. 20 is derived from the subcarrier demodulator 202 (FIG. 15), a block diagram of which is shown in FIG. 24. As previously noted, the WIDEBAND VIDEO signal from the analog processor 200 (FIG. 15) is passed to the subcarrier into which the serial audio data is fed from the audio section of demodulator via an input amplifier 251 and a 6.6 MHz bandpass filter 252. The resultant 6.6 MHz audio subcarrier is passed to a phase demodulator 253.

The phase demodulator 253 comprises two multipliers. A first input of each multiplier is the 6.6 MHz audio subcarrier and the second input of each multiplier is a 6.6 MHz reference sinusoidal signal generated by a 6.6 MHz voltage controlled oscillator 255. The reference is shifted in phase by 90° between the two multipliers. As a result the two multipliers decode the two axes of the QPSK signal. In other words, one multiplier decodes the signal along the 0°-180° axis and the other multiplier decodes the signal along the 90°-270° axis, reflecting the two data bits transmitted for each packet of modulation.

Output of the phase demodulator 253 is latched by a latch 257 and again by another latch 258, thus accumulating four data bits. The strobe for the two latches, i.e. AUDIO DATA STROBE from the audio timing decoder 240 (FIG. 20) is delayed by a variable delay 259 in order to provide fine adjustment of where to sample the data packet. The 6.6 MHz reference clock is locked to the reference burst by sampling the voltage of one of the multipliers of the phase demodulator by a sample and hold 254. The sample and hold 254 is controlled by a BURST SAMPLE signal which occurs at the reference burst time. The resultant error is amplified and fed to oscillator 255 to achieve locking.

Since the modulation is offset by 45° relative to the reference burst, the modulator output swings positive and negative in voltage for the data and remains at zero voltage during reference burst when the oscillator is locked.

The descrambled video output of the descrambler is derived directly from the analog processor (see FIGS. 15 and 16). However, the audio data of the three audio channels must be further processed.

As shown in FIG. 15, the three channels of audio output are derived respectively from a companded audio output stage 203 and two linear audio output stages 204, 205. At each of these stages the audio signals are converted to analog form for normal reception. FIG. 22 is a block diagram of the companded output stage while FIG. 23 is a block diagram of one of the linear output stages which are similar. Referring to FIG. 22, the companded output stage comprises a shift register and latch 260 into which the serial audio data is fed from the audio section of the analog processor (FIG. 17). In accordance with the AUDIO CONTROL signals from the audio output timing decoder 221 (FIG. 17), this data is passed eight bits at a time to a μ-law D/A converter 261 where it is converted to analog format. Thereafter the signal is filtered by a 20 KHz low pass filter 262, and applied to an output amplifier 263. A bypass path 265 controlled selectively by relays 264 in response to the AUDIO CONTROL signals is provided for occasions on which the descrambler is not to be used, for example when the incoming signal is not scrambled.

The linear audio output stage shown in FIG. 23 is essentially similar, the only significant difference being that the 8-bit μ-law D/A converter is replaced by a 14-bit linear D/A converter. The block diagram shows the shift register and latch 266 which receives the serial audio data, which is converted by the linear D/A converter 267, filtered by a 20 KHz low pass filter 268 and applied to the output amplifier 269. As in the previous output stage there is an audio bypass path 270 selectively controlled by bypass relays 271.

Although the system has been described with particular reference to the scrambling and descrambling of video and audio information signals as well as user data, it is to be understood that the system can be readily modified to deal with video information signals and/or audio information signals and/or user data while remaining within the spirit and scope of the invention.

What is claim is:

1. A scrambler for scrambling video and audio information signals to be transmitted as a TV composite signal in a controlled access television communications network, the scrambler comprising:
   (i) means for stripping synchronization signals from said video information signal;
   (ii) means controlled by said synchronization signals for digitizing the video information signal;
   (iii) means for segmenting the digitized video information signal;
   (iv) means for randomly re-ordering the segments of digitized video information;
   (v) means for deriving decryption data in correspondence with the random re-ordering of said segments;
   (vi) means for deriving control signals specifically addressed to respective receiving stations of the network for selectively enabling and disabling the descramblers thereof;
   (vii) means for deriving a video data stream representing a composite of said re-ordered segments of video information, said synchronization signals, said decryption data and said addressed control signals;
   (viii) means for digitizing said audio information signals;
   (ix) menas for segmenting the digitized audio information signals in correspondence with the segmenting of the video information signal;
   (x) means for randomly re-ordering the segments of audio information in correspondence with the decryption data;
   (xi) means for deriving an audio data stream representing an audio information signal from the re-ordered audio information segments; and
   (xii) means for combining said video and audio data streams to produce the TV composite signal;
   wherein said means for randomly reordering the segments of digitized video information comprises a single memory having a plurality of address locations, single address means for addressing the memory such that each address is valid for both a read operation and a following write operation, means for writing the seqments of video information into the memory with a randomly time-varying non-sequential address, and means for reaing the segments of video information sequentially from the memory and for replacing each segment of video information so read from the memory by a next segment of video information to be written into the memory.

2. A scrambler according to claim 1 including segment address control means responsive to a randomly recurring video data bit for determining said non-sequential addressing of video segments.

3. Apparatus for encryption/decryption processing of an input composite video signal having successive segments of video information in a sequence of time slots in a synchronization framework defined by sychronizing information incorporated in the signal, comprising:
means for separating sychronizing information contained in said signal from video information contained therein;
a single memory having a plurality of locations for storing segments of video information;
single address means for addressing said locations in a plurality of different sequences such that each address is valid for both a read operation and a following write operation;
means for writing successive segments of video information from said separating means to locations addressed by said addressing means in a randomly time-varying first sequence, means for subsequently reading said segments of video information from locations addressed by said addressing means in a different sequence and for replacing each segment so read by a next segment to be written into the memory; and
means for introducing said read segments of video information into a sequence of time slots of a synchronization framework similar to that of the input signal to provide an output composite video signal within which the segments of video information are differently ordered in said time slots.

4. Apparatus according to claim 3, including sequencing means for operating the addressing means, the reading means and the writing means sequentially in that order.

5. Apparatus according to claim 3, further including means for dividing an input audio signal into successive segments corresponding to related segments of the video information, further memory means having a plurality of locations for storing segments of audio information, means for addressing said locations in the same plural different sequences as are available for addressing the video information addressing means, means for writing successive segments of audio information from said separating means to locations addressed by said addressive means in the same sequence as the related segments of video information and for subsequently reading said segments of audio information in a different sequence the same as that used for reading the corresponding segmemts of video information.

6. A method for encryption/decryption processing of an input composite video signal which comprises segments of video information within successive time slots in a synchronization framework defined by sychronization information contained by the signal, sid method comprising:
separating said segments of video information from said sychronization framework;
writing said successive segments into locations in a memory device addressed according to a randomly time-varying sequence;
reading said segments from locations in said memory device addressed according to a different sequence, each segment of video information read from an addressed location in the memory being replaced by a next segment to be written into the memory; and
reintegrating said segments into a similar synchronization framework to form an output composite video signal, but with segments in said different sequence.

7. A method according to claim 6, wherein the segments of video information are digitized prior to storage, the memory device is a digital random access memory, and the segments recovered from storage are reintegrated into a synchronization framework and restored to analog form, the edges of the segments being shaped to maintain the video bandwidth prior to said reintegration.

8. A method as claimed in claim 7, wherein one of the composite video signals contains control data indicative of the sequences in which said segments are written and read.

9. A method as claimed in claim 6, wherein the input and output composite video signals are associated with audio information, and further comprising: separating said audio information into segments within a pattern of time slots corresponding to the segments of the video information; sequentially writing said successive segments of audio information into locations in a further memory device addressed according to the same particular sequence used for write addressing locations in the memory device to which the video information segments are written; and reading said segments from locations in said further memory device addressed according to the different sequence used for addressing the memory device during reading of the associated video information segments.

10. A method according to claim 9, wherein the audio information associated with the input composite video signal is subjected to analog-to-digital conversion prior to writing into said further memory device and selectively bit-inverted as determined by the encrystion data, and is subjected to encoding after reading from said further memory device.

11. A method according to claim 9, wherein the audio information associated with the input composite video signal is subjected to demodulation prior to writing into said further memory device and selectively bit-inverted as determine by the encryption data, and is subjected to digital-to-analog conversion after reading from said further memory device.

* * * * *